(12) United States Patent
Masuda et al.

(10) Patent No.: US 11,482,383 B2
(45) Date of Patent: Oct. 25, 2022

(54) ELECTROLYTIC CAPACITOR

(71) Applicant: PANASONIC INTELLECTUAL PROPERTY MANAGEMENT CO., LTD., Osaka (JP)

(72) Inventors: Miyoko Masuda, Kyoto (JP); Yuichiro Tsubaki, Kyoto (JP); Tatsuji Aoyama, Kyoto (JP); Daisuke Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 292 days.

(21) Appl. No.: 16/643,455

(22) PCT Filed: Aug. 31, 2018

(86) PCT No.: PCT/JP2018/032478
§ 371 (c)(1),
(2) Date: Sep. 4, 2020

(87) PCT Pub. No.: WO2019/045072
PCT Pub. Date: Mar. 7, 2019

(65) Prior Publication Data
US 2020/0411252 A1      Dec. 31, 2020

(30) Foreign Application Priority Data

Aug. 31, 2017  (JP) .............................. JP2017-167592
Aug. 31, 2017  (JP) .............................. JP2017-167593

(51) Int. Cl.
*H01G 9/10* (2006.01)
*H01G 9/008* (2006.01)
(Continued)

(52) U.S. Cl.
CPC ................. *H01G 9/10* (2013.01); *H01G 2/02* (2013.01); *H01G 9/008* (2013.01); *H01G 9/08* (2013.01)

(58) Field of Classification Search
CPC ........................................................ H01G 9/10
See application file for complete search history.

(56) References Cited

U.S. PATENT DOCUMENTS

2019/0198251 A1    6/2019   Inoue et al.

FOREIGN PATENT DOCUMENTS

EP          2682967 A1    1/2014
JP       S54-000977 Y    1/1979
(Continued)

OTHER PUBLICATIONS

First Office Action issue in Chinese Patent Applicatoin No. 201880056421.2, dated Apr. 23, 2021; with English translation.
(Continued)

*Primary Examiner* — Eric W Thomas
(74) *Attorney, Agent, or Firm* — McDermott Will & Emery LLP

(57) ABSTRACT

Disclosed is an electrolytic capacitor including: a capacitor element including a pair of electrodes; an electrolyte interposed between the pair of electrodes, a pair of leads electrically connected to the pair of electrodes, respectively; a case in which the capacitor element and the electrolyte are accommodated, and that has an opening, a sealing member that seals the opening, and has a pair of insertion holes for leading out the leads; an insulating plate having a pair of through holes for leading out the leads; and a resin member filled between the sealing member and the insulating plate, wherein the insulating plate has a resin bonding surface that abuts against the resin member, and a mounting surface
(Continued)

opposed to the resin bonding surface, and includes at least one protrusion or recess on the resin bonding surface.

16 Claims, 27 Drawing Sheets

(51) Int. Cl.
*H01G 9/08* (2006.01)
*H01G 2/02* (2006.01)

(56) References Cited

FOREIGN PATENT DOCUMENTS

| JP | S57-006015 U | 1/1982 | |
|---|---|---|---|
| JP | S58-109243 U | 7/1983 | |
| JP | S61-113223 A | 5/1986 | |
| JP | H1-107123 U | 7/1989 | |
| JP | H02-194614 A | 8/1990 | |
| JP | H06-338439 A | 12/1994 | |
| JP | H07-086102 A | 3/1995 | |
| JP | H07-254530 A | 10/1995 | |
| JP | 11288853 A * | 10/1999 | |
| JP | 11354383 A * | 12/1999 | ............. H01G 9/004 |
| JP | 2000-269081 A | 9/2000 | |
| JP | 2008-130774 A | 6/2008 | |
| WO | 2012/117820 A1 | 9/2012 | |
| WO | 2018/062411 A1 | 4/2018 | |

OTHER PUBLICATIONS

International Search Report and Written Opinion issued International Patent Application No. PCT/JP2018/032478, dated Nov. 13, 2018; with partial English translation.

* cited by examiner

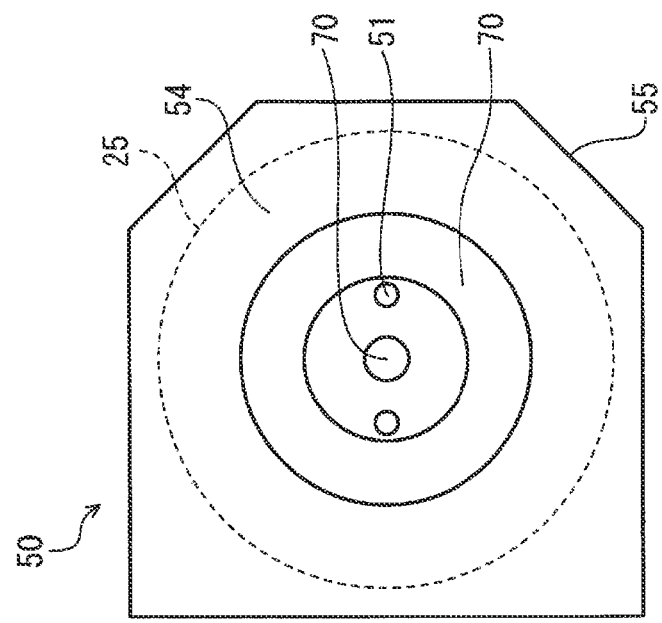

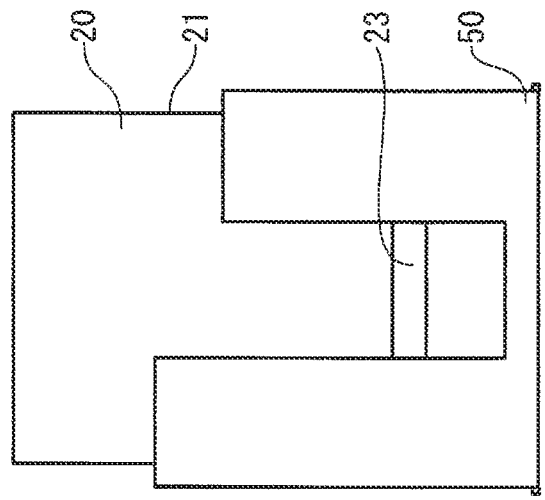
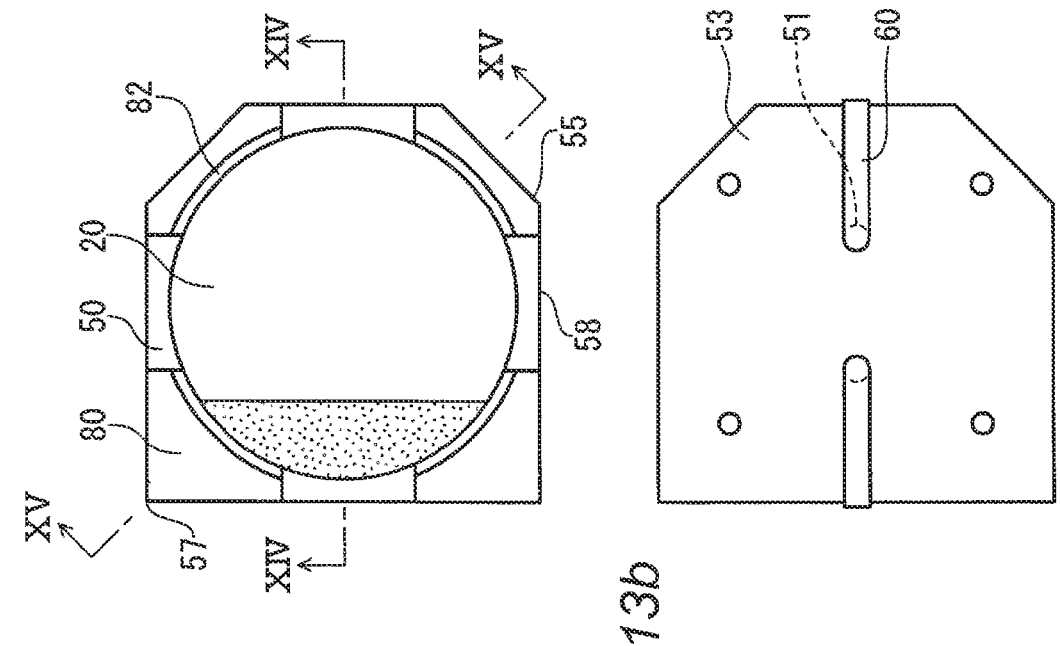

ELECTROLYTIC CAPACITOR

CROSS-REFERENCE OF RELATED APPLICATIONS

This application is the U.S. National Phase under 35 U.S.C. § 371 of International Patent Application No. PCT/JP2018/032478, filed on Aug. 31, 2018, which in turn claims the benefit of Japanese Application No. 2017-167592, filed on Aug. 31, 2017, and Japanese Application No. 2017-167593, filed on Aug. 31, 2017, the entire disclosures of which Applications are incorporated by reference herein.

TECHNICAL FIELD

The present invention relates to an electrolytic capacitor, and particularly relates to an electrolytic capacitor including a resin member between a sealing member and a base plate. Note that the present application is based upon and claims the benefit of priority from the corresponding Japanese Patent Application Nos. 2017-167592 and 2017-167593 both filed on Aug. 31, 2017, the entire contents of which are incorporated herein by reference.

BACKGROUND ART

In general, due to their high reliability, electrolytic capacitors are being widely used, not only for consumer devices, but also as a part of vehicle-mounted circuits that are used under severe conditions. In particular, electrolytic capacitors used in an environment with high temperature and humidity, such as in an engine, are required to ensure operations, for example, at about 150° C. for the period of time on the order of several thousands of hours.

A typical electrolytic capacitor includes a capacitor element including a pair of electrodes; an electrolyte interposed therebetween, a case in which the capacitor element and the electrolyte are accommodate, and that has an opening; a sealing member that is made of butyl rubber and seals the opening; a base plate having a pair of through holes, and a pair of leads that are electrically connected to the pair of electrodes, respectively, and extend from the through holes. Voids are formed between the sealing member and the insulating plate, and the sealing member is substantially exposed to outside air (environment with high temperature and humidity).

In general, the butyl robber contained in the sealing member is a high-molecular weight polymer, which, upon exposure to air (oxygen) or water (moisture), undergoes oxidation degradation, causing the molecular chains thereof to break down and the molecular weight thereof to decrease. In addition, the seating member contains carbon, and, when exposed to an environment with high temperature and humidity, undergoes a reduction in volume and becomes susceptible to cracking, and the carbon molecules contained in the seating member are bound together to increase the conductivity of the seating member, thus generating a leakage current between the pair of electrodes, which may impair the function of the electrolytic capacitor.

For example, the electrolytic capacitor described in PTL 1 includes a base plate including, at the center thereof, a depressed portion that is depressed so as to receive a lower portion of a capacitor body; and the capacitor body in which a capacitor element including an electrolyte is stored in a tubular metal case that is closed at the top, the lower opening of metal case is sealed by a seating member, a pair of electrode terminals that are lead out downward from the capacitor element penetrate the sealing member so as to extend downward, and the electrode terminals further penetrate the base plate, and are bent along the bottom surface of the base plate in a direction away from each other. The capacitor body is fixed to the base plate with an adhesive injected into a recess that is provided in a non-depressed portion located around the depressed portion of the base plate and that is open at least on the depressed portion side.

The adhesive described in PTL 1 is injected from the recess of the non-depressed portion located around the depressed portion of the base plate, and serves to reliably fix the base plate and the capacitor body.

Additionally, for example, the chip-type capacitor described in PTL 2 seals the opening of a packaging case by a sealing member made of an elastic rubber or the like, and the so-called curling, in which the opening of the packaging case and a side surface located near the opening are drawn in, is further performed to seal the interior of the packaging case. PTL 2 proposes that, to an end face of a capacitor including a plurality of lead wires all guided out from the end face, an insulating plate having apertures at positions corresponding to the lead wires is abutted against, and the lead wires that are passed through the apertures so as to protrude from the insulating plate are bent along an end face of the insulating plate, and a resin layer is formed in a gap between the end face of the capacitor and the insulating plate, and gaps between the lead wires of the capacitor and the corresponding apertures of the insulating plate.

The resin layer described in PTL 2 is formed in the gap between the end face of the capacitor and the insulating plate, and the gaps between the lead wires of the capacitor and the apertures of the insulating plate, and severs to prevent water or a washing solvent from entering from the spaces between the lead wires, to which stress has been applied by the bending process, and the apertures of the insulating plate, thus realizing high reliability.

CITATION LIST

Patent Literature

[PTL 1] Japanese Laid-Open Patent Publication No. 2000-269081
[PTL 2] Japanese Laid-Open Patent Publication No. H2-194614

SUMMARY OF INVENTION

Technical Problem

However, although the adhesive described in PTL 1 is injected from the recess of the non-depressed portion located around the depressed portion of the base plate, and assists the fixing of the capacitor body to the base plate, the rubber sealing member attached to the opening of the packaging case is easily exposed, during use, to air (oxygen) and/or water (moisture) entering the packaging case via holes provided in the base plate and is very susceptible to oxidation. When oxidized, the sealing member undergoes a reduction in volume and becomes susceptible to cracking, and the molecular weight of the rubber that forms the sealing member is reduced, and the carbon molecules contained in the sealing member are bound together, so that a leakage current tends to be generated between the pair of electrode terminals.

Since the resin layer described in PTL 2 is formed in the gap between the end face of the capacitor and the insulating plate, and the gaps between the lead wires of the capacitor and the apertures of the insulating plate, it can be considered that the sealing member, which is similarly made of an elastic rubber or the like, will be protected from air (oxygen) and/or water (water vapor) entering from the outside. However, the resin layer is made of epoxy resin or silicone resin, and has a coefficient of thermal expansion significantly different from that of the sealing member made of an elastic rubber. Accordingly, the resin layer may be detached from the sealing member by heat shock as a result of a long-tom use, resulting in formation of voids in the interface therebetween. When voids are framed between the resin layer and the sealing member, the sealing member made of an elastic rubber is similarly exposed to air (oxygen) and/or water (moisture) entering from the outside, then undergoes oxidation, and becomes susceptible to cracking. Furthermore, a leakage current may be generated between the pair of electrode terminals via water that has been accumulated in the voids.

Therefore, it is an object of an aspect of the present invention to provide an electrolytic capacitor that realizes high reliability over a long period of time even under severe operating conditions, by filling a resin member between a sealing member and an insulating plate (base plate) to enhance the adhesion between the resin member and the sealing member, thus reliably blocking air (oxygen) and/or water (water vapor) entering from the outside to prevent oxidation degradation of the sealing member.

Solution to Problem

An electrolytic capacitor according to an aspect of the present invention includes a capacitor element including a pair of electrodes, an electrolyte interposed between the pair of electrodes; a pair of leads electrically connected to the pair of electrodes, respectively; a case in which the capacitor element and the electrolyte are accommodated, and that has an opening; a sealing member that seals the opening, and has a pair of insertion holes for leading out the leads, an insulating plate having a pair of through holes for leading out the leads, and a resin member filled between the sealing member and the insulating plate, wherein the insulating plate has a resin bonding surface that abuts against the resin member, and a mounting surface opposed to the resin bonding surface, and includes at least one protrusion or recess on the resin bonding surface.

Advantageous Effects of Invention

With the electrolytic capacitor according to an aspect of the present invention, it is possible to realize high reliability over a long period of time even under severe operating conditions, by filling a resin member between a sealing member and an insulating plate (base plate) to enhance the adhesion between the resin member and the sealing member, thus reliably blocking air (oxygen) and/or water (water vapor) entering from the outside to prevent oxidation degradation of the sealing member.

BRIEF DESCRIPTION OF DRAWING

FIG. 4(a) is a cross-sectional view of another electrolytic capacitor according to the first embodiment, and FIG. 4(b) is a plan view of the base plate shown in FIG. 4(a), as viewed from above.

FIGS. 13(a) to 13(c) are a plan view, a bottom view, and a side view similar to FIGS. 2(a) to 2(c), showing an electrolytic capacitor according to another modification of the first embodiment.

DESCRIPTION OF EMBODIMENTS

Figure 1:
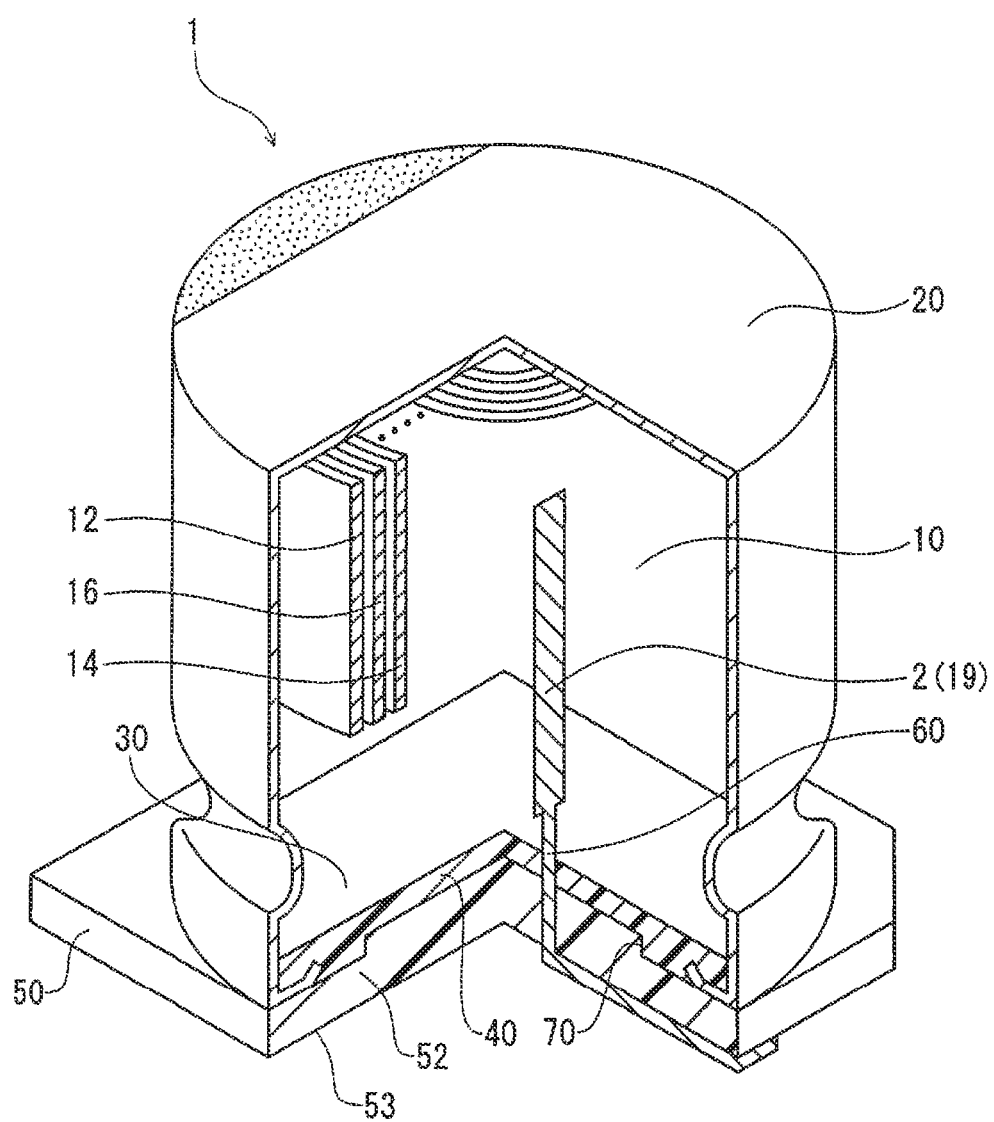
FIG. 1 is a partial broken-away perspective view partially showing the interior of an electrolytic capacitor according to a first embodiment of the present invention.

Hereinafter, embodiments of an electrolytic capacitor according to the present invention will be described with reference to the accompanying drawings. In the description of the embodiments, terms (e.g., "upper", "lower", "outside", "inside", etc.) that are used to indicate directions in order to facilitate the understanding are merely illustrative, and these toms are not intended to limit the present invention. In the drawings, constituent parts of the electrolytic capacitor are illustrated in relative dimensions in order to clarify the shape or the characteristics thereof, and are not necessarily shown with the same scale ratio.

First Embodiment

Figure 2C:
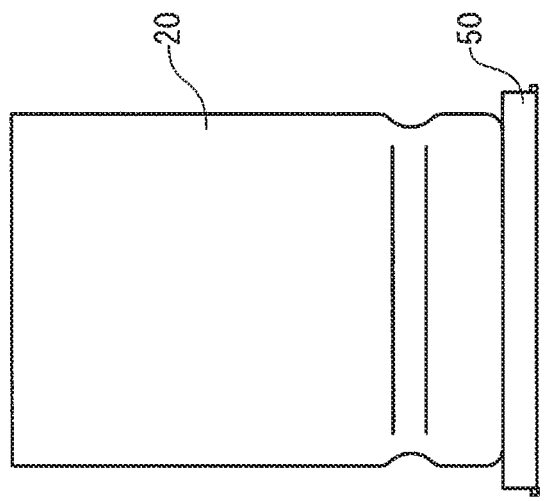
FIGS. 2(a) to 2(c) show a plan view, a bottom view, and a side view, respectively, of the electrolytic capacitor shown in FIG. 1.
Figure 2A:
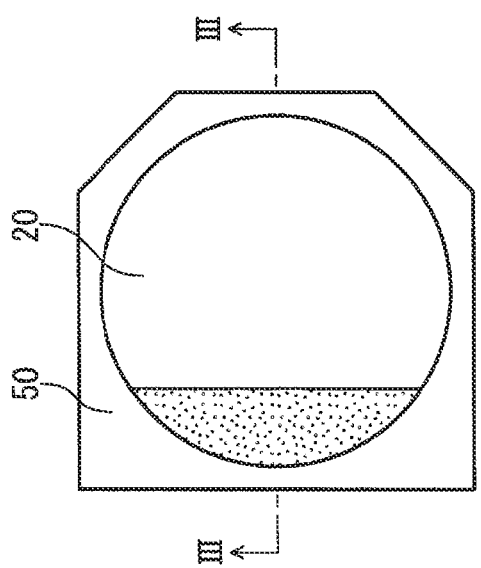
Figure 2B:
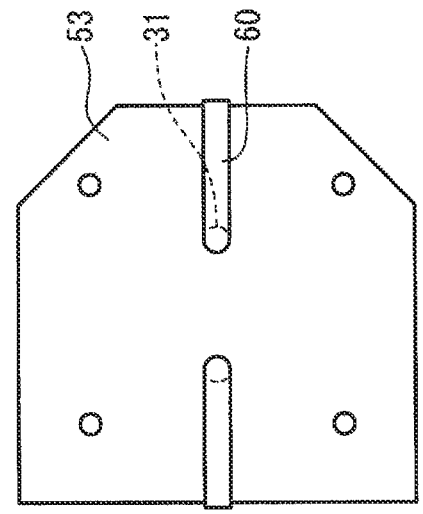

FIG. 1 is a partial broken-away perspective view partially showing the interior of an electrolytic capacitor 1 according to a first embodiment of the present invention. FIGS. 2(a) to 2(c) are a plan view, a bottom view, and a side view, respectively, of the electrolytic capacitor 1 shown in FIG. 1. As schematically shown in FIG. 1, the electrolytic capacitor 1 according to the first embodiment includes a capacitor element 10 including a pair of electrodes 2 (only one electrode 2 is shown in the drawing), an electrolyte (not shown) interposed between the pair of electrodes 2, a case 20 that accommodates the capacitor element 10 and the electrolyte and has an opening, a base plate 50 (also referred to as an "insulating plate") having a pair of through holes 51 (FIG. 3), a resin member 40 (also referred to as an "adhesive material") filled between the sealing member 30 and the base plate 50, and a pair of leads 60 connected to the pair of electrodes 2 of the capacitor element 10 and extending from the through holes 51 of the base plate 50. In addition, the base plate 50 has a resin bonding surface 52 that abuts against the resin member 40, and a mounting surface 53 opposed thereto, and includes at least one protrusion 70 on the resin bonding surface 52.

Hereinafter, the capacitor element 10, the case 20, the sealing member 30, and the leads 60 (electrode 2) that are widely used for the electrolytic capacitor 1 will be described with reference to the accompanying drawings. However, the present invention is not limited to these constituent parts, and other capacitor elements, cases, sealing members, and electrodes may be used. Note that the electrolytic capacitor 1 according to the present invention is also applicable to electrolytic capacitors that use an electrolytic solution or a solid electrolyte such as a conductive polymer as the electrolyte, and the so-called hybrid electrolytic capacitor that uses an electrolytic solution and a solid electrolyte as the electrolyte.

(Capacitor Element)

Referring again to FIG. 1, the capacitor element 10 will be described. The capacitor element 10 is generally formed by winding an anode foil 12 having a dielectric layer, a cathode foil 14, and a separator 16 that retains an electrolyte between the anode foil 12 and the cathode foil 14. In addition, the capacitor element 10 includes a pair of electrodes 2 (only one electrode 2 is shown in FIG. 1) electrically connected to the anode foil 12 and the cathode foil 14, respectively. The capacitor element 10 further includes a winding stop tape (not shown) with which the outermost layer thereof is fixed.

Although not by way of limitation, the anode foil 12 is formed by roughening the surface of a metal foil made of a valve metal such as aluminum, tantalum, or niobium, or an alloy containing these valve metals. Surface roughening of the metal foil may be performed using an etching technique such as direct-current electrolysis or alternating-current electrolysis. By roughening the surface of the metal foil, a plurality of projections and depressions can be formed on the surface of the metal foil. The dielectric layer on the anode foil 12 is formed along the inner wall surfaces of holes or dents (pits) on the roughened surface, so that the surface area can be increased.

The dielectric layer on the anode foil 12 may be formed, for example, by immersing the metal foil in a chemical formation solution such as an ammonium adipate solution, and subjecting the metal foil (with a voltage applied thereto, if necessary) to chemical formation treatment. In general, the anode foil 12 can be mass-produced by roughening the surface of a large-sized metal foil containing a valve metal or the like, then subjecting the surface to chemical formation treatment, and thereafter cutting the metal foil to a desired size.

Similarly, the cathode foil 14 is formed by roughening the surface of a metal foil made of a valve metal such as aluminum, tantalum, or niobium, or an alloy containing these valve metals. If necessary, the cathode foil 14 may be subjected to surface roughening and/or chemical formation treatment, as in the case of the anode foil 12.

Although not by way of limitation, the separator 16 may be formed, for example, using a non-woven fabric or the like containing fibers of cellulose, polyethylene terephthalate, vinylon, polyamide (e.g., aliphatic polyamide, aromatic polyamide such as aramid).

The capacitor element 10 can be formed, for example, by stacking and winding the anode foil 12 on which a dielectric layer is famed, the separator 16, and the cathode foil 14, and causing the separator 16 to retain an electrolyte. The capacitor element 10 shown in FIG. 1 is formed such that ends of the pair of electrodes 2 (only one electrode 2 is shown in FIG. 1) are electrically connected to the anode foil 12 and the cathode foil 14, respectively, and the other ends thereof extend from an end face (a lower end face in FIG. 1) of the capacitor element 10.

As the electrolyte, it is possible to use a solid electrolyte, an electrolytic solution, and a hybrid electrolyte obtained by combining an electrolytic solution and a solid electrolyte or the like. The electrolyte may be a mixture of a non-aqueous solvent and an ionic substance (a solute, e.g., an organic salt) dissolved in the non-aqueous solvent. The non-aqueous solvent may be an organic solvent or an ionic liquid. As the non-aqueous solvent, it is possible to use, for example, ethylene glycol, propylene glycol, sulfolane, γ-butyrolactone, N-methylacetamide and the like. Examples of the organic salt include trimethylamine maleate, triethylamine borodisalicylate, ethyldimethylamine phthalate, mono 1,2, 3,4-tetramethylimidazolinium phthalate, and mono 1,3-dimethyl-2-ethylimidazolinium phthalate.

The solid electrolyte contains, for example, a manganese compound or a conductive polymer. As the conductive polymer, it is possible to use, for example, polypyrrole, polythiophene, polyaniline, and derivatives thereof. The solid electrolyte containing a conductive polymer can be formed, for example, by subjecting a raw material monomer to chemical polymerization and/or electrolysis polymerization on the dielectric layer. Alternatively, the solid electrolyte can be formed by applying, to a dielectric layer, a solution in which a conductive polymer is dissolved, or a dispersion in which a conductive polymer is dispersed. Note that the capacitor element is not limited to those described above, and may have any configuration as long as it serves the function of a capacitor element.

(Sealing Member)

The sealing member 30 can be framed using any insulating material, but is preferably framed using a rubber member having high elasticity and high sealing performance. In addition, examples of a rubber member having high heat resistance include silicone rubber, fluorine rubber, ethylene propylene rubber, chlorosulfonated polyethylene rubber (Hypalon rubber, etc.), butyl rubber, and isoprene rubber.

The sealing member 30 has a planar shape (e.g., a circular plate-shape or a disc shape) corresponding to the shape of the opening of the case 20, and is molded in advance so as to have insertion holes (not shown) for passing the tab portions 19 of the electrodes 2 therethrough.

(Electrodes)

Each of the pair of electrodes 2 has a tab portion 19 extending from the capacitor element 10, and a pair of leads 60 are connected to the tab portions 19 inside the sealing member 30 by welding or the like. Preferably, the tab portions 19 are formed of, for example, a valve metal such as aluminum, and is covered with an oxide film of that metal. On the other hand, the leads 60 are formed of, for example, a CP wire, a Cu wire or the like that contains a transition metal such as iron, copper, nickel, and tin. Although a portion of each of the tab portions 19 and each of the leads 60 is embedded in the sealing member 30, the diameter of the leads 60 is smaller than the diameter of the tab portions 19, and, therefore, an annular space 32 is formed around each of the leads 60 in the sealing member 30.

(Case)

Typically, the case 20 has a substantially cylindrical shape, and has an opening that accommodates the capacitor element 10 and the sealing member 30. The case 20 having a substantially cylindrical shape has a side portion 21, and a substantially annular drawn portion 23 and a curled portion 25 that extend continuously with the side portion 21. That is, the curled portion 25 defines the opening of the case 20. The case 20 is formed using, for example, a metal such as aluminum, stainless steel, copper, iron, and brass, or alloys thereof. Note that the side portion 21, the drawn portion 23, and the curled portion 25 of the case 20 may be partially or entirely coveted by a laminate film, or may not be coveted thereby. The necessity for a covering of a laminate film and the material of the laminate film may be determined based on determining the adhesion compatibility with a resin member 40, which will be described below.

(Resin Member, Adhesive Material)

Figure 3B:
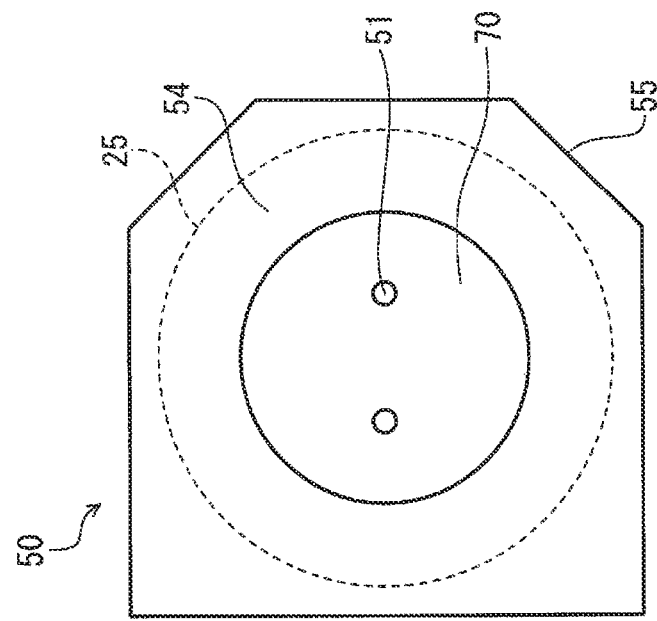
FIG. 3(b) is a plan view of the base plate shown in FIG. 3(a), as viewed from above.

The electrolytic capacitor 1 according to an embodiment of the present invention includes a resin member 40 filled between the sealing member 30 and a base plate 50, which will be described below. FIG. 3(*a*) is a cross-sectional view of the electrolytic capacitor 1, taken along the line III-III in FIG. 2(*a*). As shown in FIG. 3(*a*), in the electrolytic capacitor 1, the capacitor element 10 and the sealing member 30 are accommodated in the case 20. Then, in a state in which the electrolytic capacitor 1 is vertically inverted from the state shown in FIG. 3(*a*), uncured fluid resin is filled in a space defined by the surface of the sealing member 30, the inner surface of the case 20 and the resin bonding surface 52 of the base plate 50, and the annular spaces 32 formed around the leads 60 so as to seal these spaces in a liquid-tight manner, thereby forming a resin member 40.

In general, a liquid in the electrolytic capacitor 1 such as the electrolytic solution may be vaporized, for example, as a result of reflowing under severe conditions or a long-term use under a high-temperature environment, and the vaporized gas may increase the internal pressure of the case 20, resulting in a stress applied to the sealing member 30. When the internal pressure of the case 20 is increased, the electrolytic solution may infiltrate (permeate) into the sealing member 30, or may reach the resin member 40 via the space between the sealing member 30 and the tab portions 19 of the electrodes 2, or minute voids formed in the interface between the sealing member 30 and the case 20. Then, if the electrolytic solution is evaporated and diffused to the outside of the case 20, the electrolytic capacitor 1 is no longer able to maintain its predetermined properties.

However, according to the first embodiment of the present invention, the resin member 40 is fixed so as to adhere to the case 20 and the base plate 50 by providing the base plate 50 with the protrusion 70. Accordingly, even if a liquid such as an electrolytic solution is evaporated in the case 20, and infiltrates (permeates) into the sealing member 30 or reaches the resin member 40 via minutes voids, the resin member 40 can substantially suppress or prevent evaporation and diffusion of the electrolytic solution from the inside to the outside of the case 20, thus making it possible to maintain the desired reliability of the electrolytic capacitor 1.

That is, as described in [Technical Problem] above, the protrusion 70 according to the first embodiment of the present invention enhances the adhesion (sealing performance) between the resin member 40 (adhesive material) and each of the case 20 and the sealing member 30 by lengthening an entry path of air or the like entering the case 20 from the outside and an evaporation-diffusion path of a liquid, such as the electrolytic solution in the case 20, being evaporated and diffused to the outside, and making these paths intricate (circuitous), thus realizing the desired long-term reliability of the electrolytic capacitor 1.

The resin member 40 according to the first embodiment of the present invention is filled so as to seal the annular spaces 32 formed around the leads 60 in a liquid-tight manner. Accordingly, even if the electrolytic solution reaches the interface between the sealing member 30 and the resin member 40, or the annular space 32, it is possible to prevent corrosion of the leads 60 formed of a material containing a transition metal.

Next, the production processes performed before and after filling the resin member 40 will be described more specifically. After the capacitor element 10 and the sealing member 30 have been accommodated in the case 20, a portion near the opening end of the side portion 21 of the case 20 is drawn (deformed by pressure applied thereto from the circumferential direction), to form a drawn portion 23, and the case 20 is sealed by the sealing member 30. Additionally, the opening end of the case 20 is curled (the opening end is deformed inward in the radial direction) to form a U-shaped or L-shaped curled portion 25. That is, the drawn portion 23 and the curled portion 25 of the case 20 are formed so as to be continuous with the side portion 21.

Then, in the case 20 that has been subjected to curling, uncured fluid resin is potted, applied or injected onto the sealing member 30, and, thereafter, the base plate 50 is disposed, with the leads 60 being passed through the through holes 51. At this time, the curled portion 25 abuts against a portion (referred to as a "reference surface 54" in the present application), on which the protrusion 70 is not framed, of the resin bonding surface 52 of the base plate 50, whereby the case 20 is aligned with the base plate 50 in the vertical direction (height direction). Thereafter, the fluid resin is cured, thereby forming a resin member 40 filled between the sealing member 30 and the base plate 50. Additionally, after the resin member 40 has been formed by curing the fluid resin, the leads 60 are bent so as to extend along the mounting surface 53 of the base plate 50.

Preferably, the fluid resin is thermosetting or photo-curable. The fluid resin may contain a filler, a curing agent, a polymerization initiator, and/or a catalyst. The thermosetting fluid resin may contain, for example, epoxy resin, phenol resin, urea resin, polyimide, polyamide imide, polyurethane, diallyl phthalate, or an unsaturated polyester. The filler may contain, for example, one or more insulating compounds (oxide, etc.) such as silica and alumina, or one or more types of insulating particles of glass, a mineral material (talc, mica, clay, etc.) or the like.

The fluid resin may be, or may contain, for example, a thermoplastic resin such as polyphenylene sulfide (ITS) or polybutylene terephthalate (PBT). Additionally, the fluid resin may be injected using a molding technique such as injection molding, insert molding or compression molding.

(Base Plate, Insulating Plate)

Figure 5:
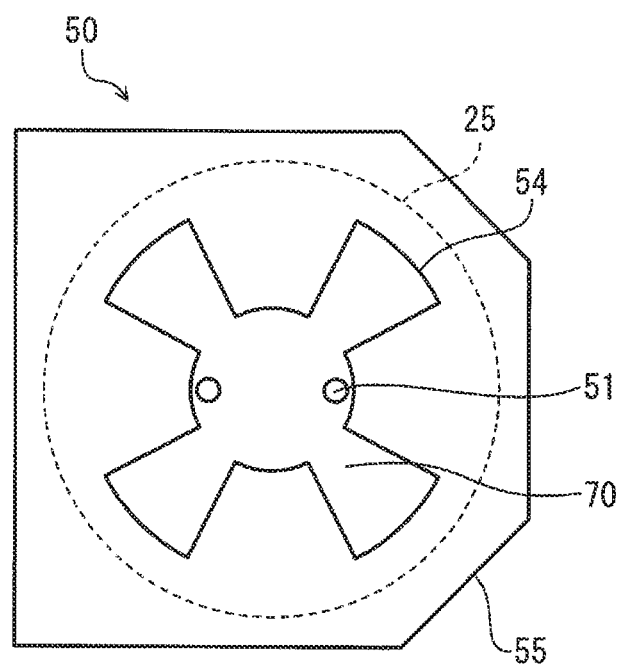
FIG. 5 is a plan view of a base plate of yet another electrolytic capacitor according to the first embodiment, as viewed from above.

FIG. 3(*b*) is a plan view of the base plate 50 shown in FIG. 3(*a*), as viewed from above. FIG. 4(*a*) is a cross-sectional view of another electrolytic capacitor 1 according to the first embodiment, and FIG. 4(*b*) is a plan view of the base plate 50 shown in FIG. 4(*a*), as viewed from above. FIG. 5 is a plan view of a base plate 50 of yet another electrolytic capacitor 1 according to the first embodiment, as viewed from above. In the drawings, a set of points (i.e., a circle) at which the curled portion 25 of the case 20 abuts against the reference surface 54 of the base plate 50 is indicated by the dashed line.

As shown in FIGS. 3(*b*) and 4(*b*), the base plate 50 according to the embodiment of the present invention, in its simplest form, has a substantially square planar shape, and includes two cut-out portions 55 for indicating the polarities. In addition, the base plate 50 has a resin bonding surface 52 (upper surface) that abuts against the resin member 40, and a mounting surface 53 flower surface) opposed to a mounting substrate (not shown), and includes at least one protrusion 70 on the resin bonding surface 52. The protrusion 70 may be a single protrusion formed concentrically with the center of the case as shown in FIG. 3(*b*), or may include two protrusions 70 as shown in FIG. 4(*b*). Alternatively, the protrusion 70 may be a combination of a protrusion 70 disposed near the center and protrusions 70 extending radially (in the radial direction), as shown in FIG. 5. Further, a larger number of protrusions 70 may be provided, or a grid-shaped or zigzag-shaped protrusion 70 (not shown) may be provided.

When the electrolytic capacitor 1 is subjected to a significant change in ambient temperature (thermal shock) during use, the sealing member 30 tends to significantly expand or contract relative to the resin member 40, due to the difference in coefficient of thermal expansion between the sealing member 30 and the resin member 40. However, according to the first embodiment of the present invention, by providing the resin bonding surface 52 with the protrusion 70, it is possible to substantially increase the adhesion strength between the sealing member 30 and the resin member 40 to reliably block air (oxygen) and/or water (water vapor) entering from the outside, and to substantially suppress or prevent evaporation and diffusion (reduction) of a liquid such as an electrolytic solution to the outside of the case 20, thus ensuring the desired long-term reliability of the electrolytic capacitor 1.

Although not illustrated in detail, an inclined portion or a curved portion (not shown) may be provided near each of the through holes 51 of the base plate 50, in order to reduce the stress applied to the leads 60 when the leads 60 are bent after the resin member 40 has been cured. Since the through holes 51 of the base plate 50 are formed in the protrusion 70, the inclined portion or the curved portion can be easily formed as compared with a case where no protrusion is formed as in the conventional techniques.

Figure 6:
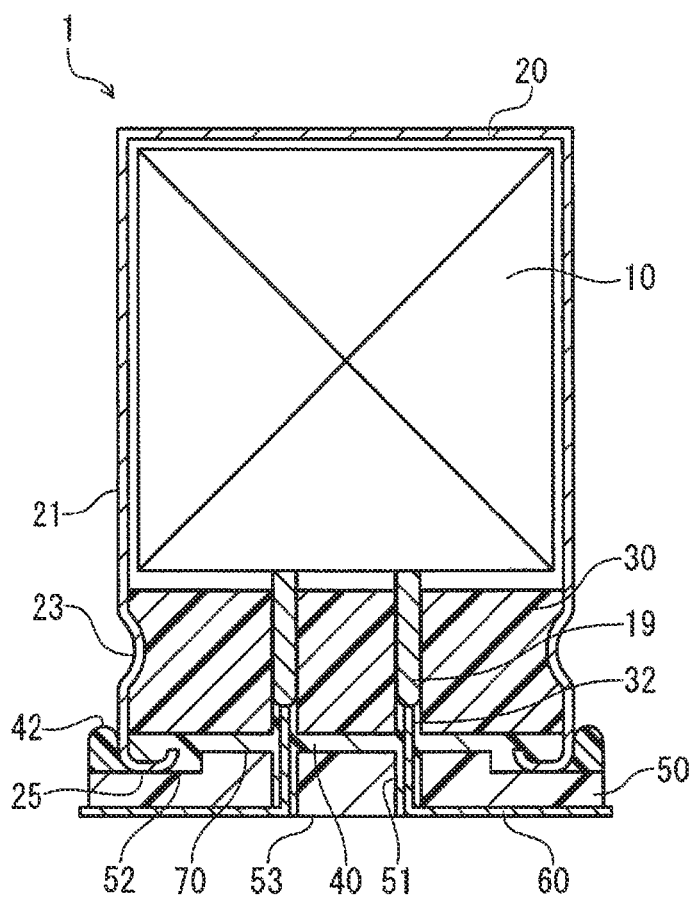
FIG. 6 is a cross-sectional view similar to that shown in FIG. 4(a), showing peripheral fixing portions that communicate with a resin member of the electrolytic capacitor.

Furthermore, the resin member 40 according to an embodiment of the present invention preferably includes, as shown in FIG. 6, peripheral fixing portions 42 extending from the curled portion 25 toward the drawn portion 23, and configured to restrict or fix the case 20 from the outside by being bonded to at least a portion of the outer surface of the case 20 (the detailed description will be given later). Accordingly, the adhesion strength between the resin member 40 and each of the base plate 50 and the case 20 is further improved, so that it is possible to more reliably achieve the blocking of air or the like entering from the outside, and the prevention of evaporation and diffusion of an electrolytic solution or the like to the outside, thus realizing higher reliability of the electrolytic capacitor 1.

(Peripheral Fixing Portion)

As described above, the portion (FIG. 6) of the resin member 40 that fixes the case 20 from the outside is referred to as a peripheral fixing portion 42 in the present application, for the sake of tire convenience. Preferably, the peripheral fixing portion 42 is integrated in one piece with the resin member 40 filled between the sealing member 30 and the base plate 50, or in other words, in communication (continuous) with the resin member 40. The peripheral fixing portion 42 can be easily formed by providing a flow channel through which uncured fluid resin for forming the resin member 40 flows to the outside of the case 20.

Next, the configuration of the base plate 50 or the curled portion 25 of the case 20 for forming the peripheral fixing portions 42 will be described with reference to FIGS. 7 to 11. FIGS. 7(*a*) to 7(*d*) are plan views of a base plate 50 obtained by forming recessed flow channels 56 (groove portions) in the reference surface 54 of the resin bonding surface 52 of the base plate 50 shown in FIGS. 3(*b*) and 4(*b*). In the drawings, the recessed flow channels 56 are hatched, and a set of points (i.e., a dashed circle) at which the curled portion 25 of the case 20 abuts against the reference surface 54 of the base plate 50 is indicated by the dashed line, for the sake of convenience.

In each of the cases, the curled portion 25 of the case 20 abuts against the reference surface 54 of the resin bonding surface 52 of the base plate 50, and therefore, the position of the case 20 relative to the base plate 50 in the vertical direction (height direction) is restricted (aligned). Uncured fluid resin having viscosity is potted or injected onto the sealing member 30 in a state in which the case 20 is vertically inverted. Thereafter, when the base plate 50 is pressed downward with a predetermined pressure, the fluid resin is filled in the space between the sealing member 30 and each of the reference surface 54 of the resin bonding surface 52 of the base plate 50, the protrusion 70, and the recessed flow channels 56 (FIG. 7), and in the annular spaces 32 around the leads 60.

At this time, the excess fluid resin is extruded to the outside of the case 20 via the recessed flow channels 56, and flows along the outer surface of the case 20. That is, the recessed flow channels 56 provide communication between the fluid resins located inside and outside the curled portion 25. Note that it is preferable to prevent entry of air bubbles into the space between the sealing member 30 and the base plate 50 when the base plate 50 is pressed downward. However, the present invention does not require complete prevention of entry of air bubbles, and allows entry of air bubbles to a certain degree. When the fluid resin filled and extruded in this manner has been cured, the resin member 40 and the peripheral fixing portions 42 are formed as a single piece.

The fluid resin covers the entire circumference of the curled portion 25, and the curled portion 25 (in particular, an end thereof) is disposed so as to be spaced apart from the sealing member 30. In particular, when the curled portion 25 has an U-shape, the fluid resin is filled so as to abut against the upper surface and the Iowa surface of the curled portion 25 including a curved surface protruding downward, and to abut against the inner surface and the outer surface of the distal end of the curled portion 25 extending in a direction along the resin bonding surface 52 (i.e., the fluid resin is bonded so as to surround the curled portion 25 from above, below, the left and the right), so that the resin member 40 can more firmly fix the curled portion 25.

It should be noted that the distal end of the curled portion of PTL 2 described above sticks into the sealing member, and the lower surface of the curled portion is merely bonded to the resin layer, without any resin layer formed on the upper surface of the curled portion. Therefore, the bonding strength between the curled portion and the resin layer is very low.

Figure 7A:
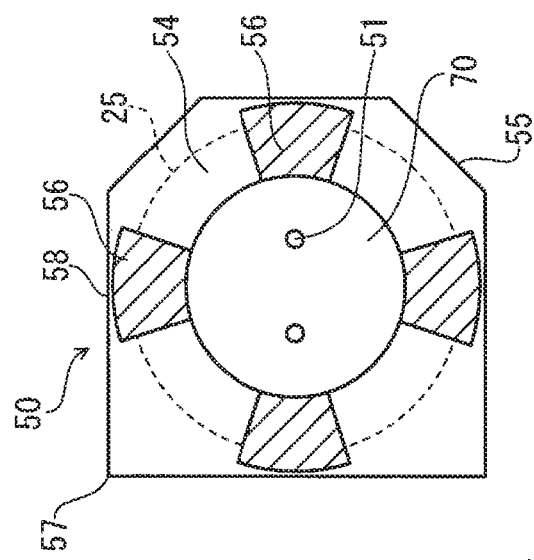
FIGS. 7(a) to 7(d) are plan views similar to those shown in FIGS. 3(b) and 4(b), showing recessed flow channels (groove portions) formed in a resin bonding surface.
Figure 7B:
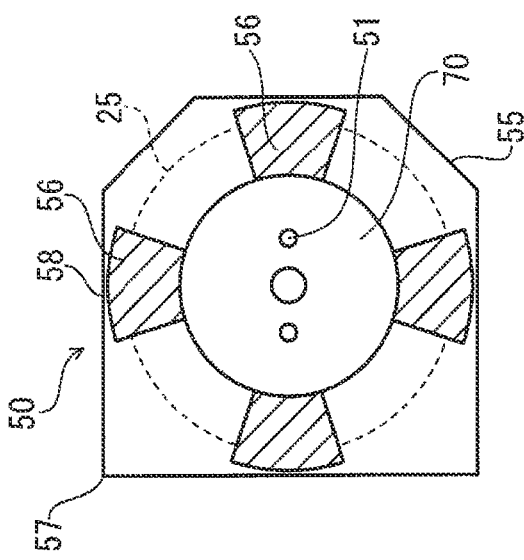
Figure 7C:
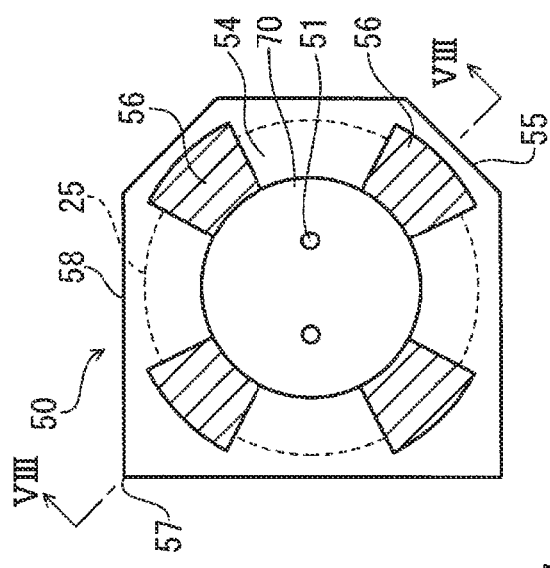
Figure 7D:
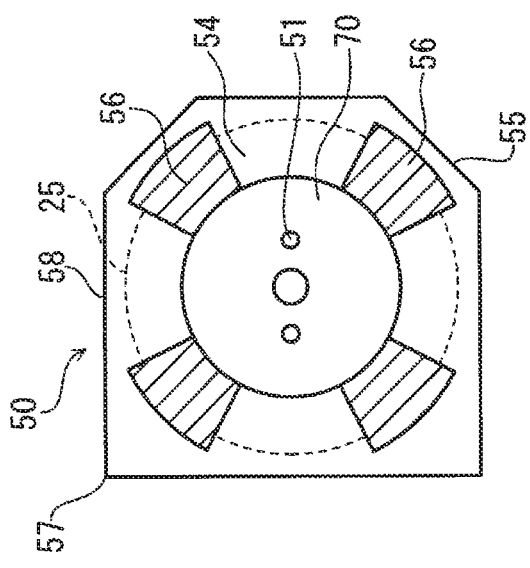
Figure 8:
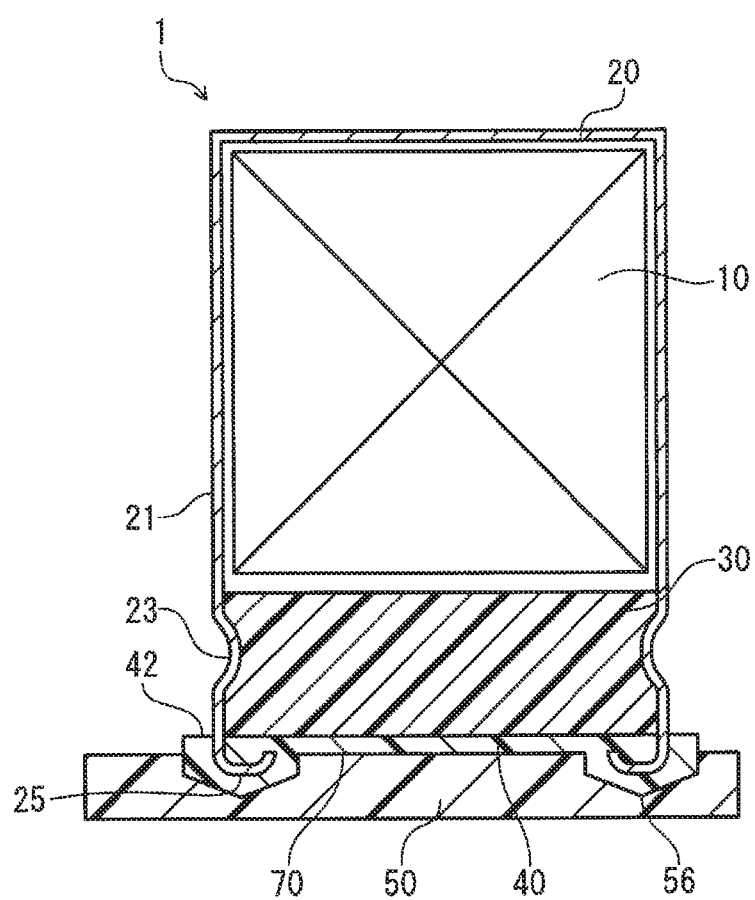
FIG. 8 is a cross-sectional view of the electrolytic capacitor, taken along the line VIII-VIII in FIG. 7(a).

The recessed flow channels 56 shown in FIGS. 7(a) and 7(b) extend toward corner portions 57 of the base plate 50, and the peripheral fixing portions 42 are formed near the corner portions 57 of the base plate 50. The recessed flow channels 56 shown in FIGS. 7(c) and 7(d) extend toward end portions 58 of the base plate 50, and the peripheral fixing portions 42 are formed near the end portions 58 of the base plate 50. Note that FIG. 8 is a cross-sectional view taken along the line VIII-VIII in FIG. 7(a), showing the recessed flow channels 56 extending toward the corner portions 57 of the base plate 50.

The planar dimensions of the base plate 50 are specified by the user specification or a standard specification, and the peripheral fixing portions 42 formed near the corner portion 57 can be formed larger than the peripheral fixing portions 42 formed near the end portion 58. Therefore, the former is more advantageous than the latter in terms of enhancement of the adhesion between the resin member 40 and each of the base plate 50 and the case 20.

Note that the number of the recessed flow channels 56 may be three or less, or may be five or more. The planar shape of the recessed flow channels 56 may be either larger or smaller than that shown in the drawings. Additionally, the recessed flow channels 56 are not limited to those extending toward the corner portions 57 or the end portions 58, but may extend toward an intermediate position between the corner portion 57 and the end portion 58, and may not necessarily be equidistantly disposed in the circumferential direction.

Figure 9:
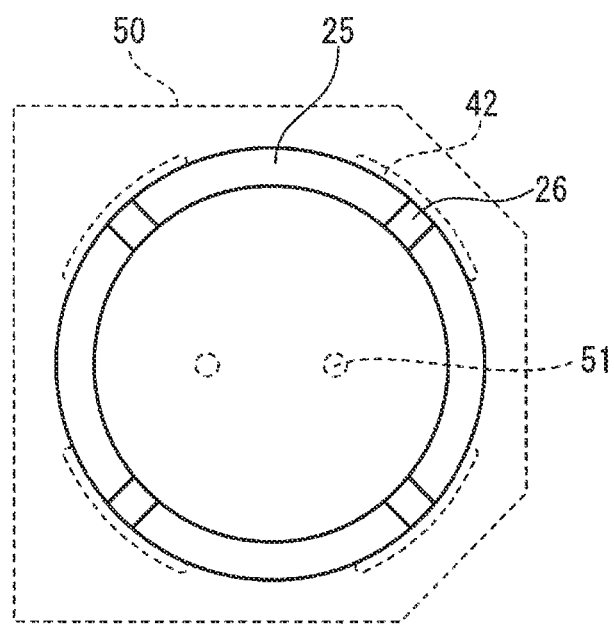
FIG. 9 is a bottom view of a curled portion of a case, as viewed from below, showing four slits provided in the curled portion.

FIG. 9 is a bottom view of the curled portion 25 of the case 20, as viewed from below, in which the position at which the base plate 50 is disposed is indicated by the dashed line. The curled portion 25 has a substantially annular planar shape, and at least one (four in FIG. 9) slit 26 is formed therein. The slit 26 of the curled portion 25 provides communication between the fluid resins located inside and outside the curled portion 25, as in the case of the recessed flow channels 56 of the base plate 50.

The curled portion 25 of the case 20 abuts against the reference surface 54 of the resin bonding surface 52 of the base plate 50 at a portion where no slit 26 is provided, and therefore, the position of the case 20 relative to the base plate 50 in the vertical direction (height direction) is restricted (aligned). Similarly, when the base plate 50 is pressed downward with a predetermined pressure after the fluid resin has been potted or injected onto the sealing member 30, the fluid resin covers the entire circumference of the curled portion 25, and is filled in the space between the sealing member 30 and the resin bonding surface 52 of the base plate 50, and in the annular spaces 32 around the leads 60. The excess fluid resin is extruded to the outside of the case 20 via the slit 26 of the curled portion 25, and flows along the outer surface of the case 20 by the action of gravity. When the fluid resin filled and extruded in this manner has been cured, the resin member 40 and the peripheral fixing portions 42 that are in communication (continuous) with each other are formed as a single piece.

Although not illustrated in detail, the number of the slits 26 of the curled portion 25 is not limited to four (FIG. 9), and may be three or less, or five or more. The slit 26 is not limited to a slit extending toward the corner portion 57 of the base plate 50, and may be a slit extending toward the end portion 58, or a slit extending toward an intermediate position between the corner portion 57 and the end portion 58, and may not necessarily be equidistantly disposed in the circumferential direction.

Figure 10:
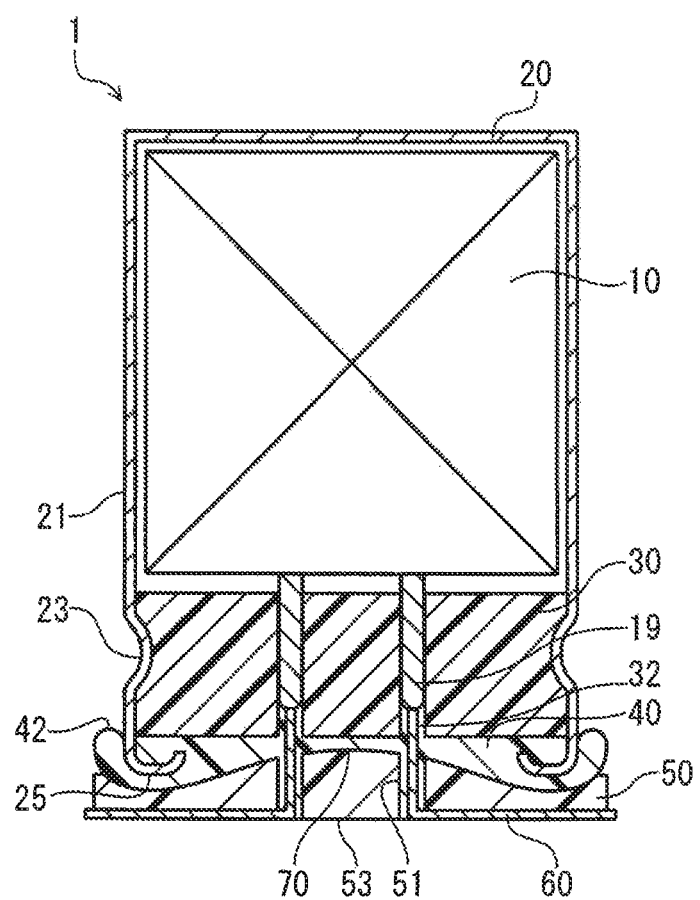
FIG. 10 is a cross-sectional view similar to that shown in FIG. 6, showing a base plate including a curved surface protruding upward from the center thereof toward the periphery thereof.

As described above, it is preferable to prevent entry of air bubbles into the space between the sealing member 30 and the base plate 50 when the base plate 50 is pressed downward with a predetermined pressure after the fluid resin has been potted or injected onto the sealing member 30. Therefore, as shown in FIG. 10, the base plate 50 may, while maintaining the reference surface 54 of the resin bonding surface 52 thereof in a flat state (see FIGS. 7(c) and 7(d)), be configured to have a curved surface on which the protrusion 70 disposed at the center and the recessed flow channels 56 extend continuously. That is, the resin bonding surface 52 of the base plate 50 may be formed so as to include a curved surface protruding upward from the center thereof toward the periphery thereof, thereby discharging air bubbles, which may be contained in the fluid resin, from the center to the periphery, and further to the outside of the case 20 from the recessed flow channels 56.

Figure 11:
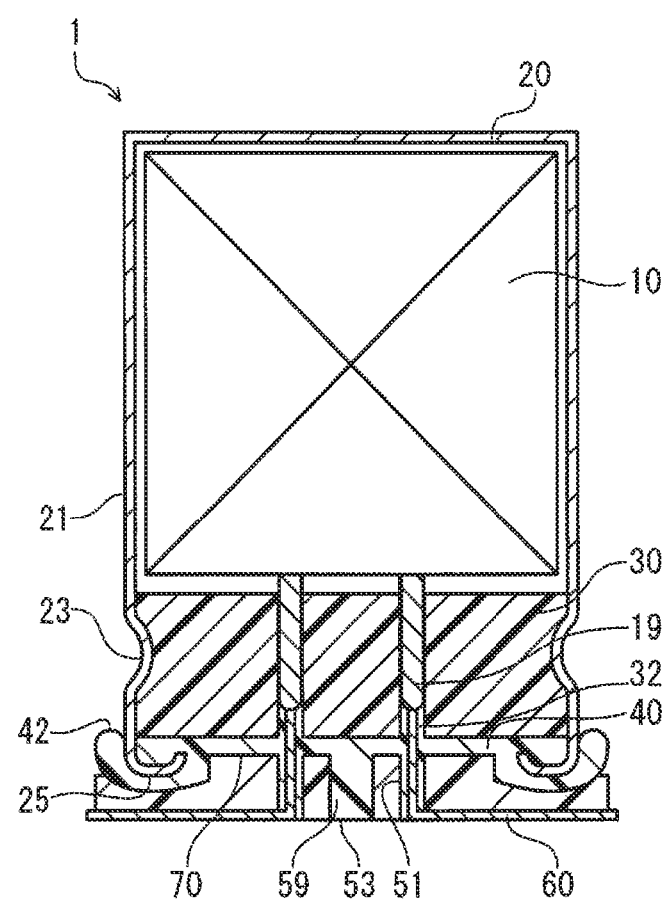
FIG. 11 is a cross-sectional view similar to that shown in FIG. 6, showing a resin injection hole extending through from a resin bonding surface to a mounting surface.

The fluid resin may be injected using a molding technique such as injection molding, insert molding or compression molding. As shown in FIG. 11, the base plate 50 may have a resin injection hole 59 extending therethrough from the resin bonding surface 52 to the mounting surface 53, for injecting uncured fluid resin into the space between the sealing member 30 and the base plate 50. One or more resin injection holes 59 may be provided. It is preferable that, separately from the resin injection hole 59, the base plate 50 has an exhaust hole (not shown) for discharging air when injecting the fluid resin, and prevents entry of air bubbles into the space between the sealing member 30 and the base plate 50. Upon completion of filling of the fluid resin, the resin injection hole 59 and the exhaust hole are filled with the fluid resin, as in the case of the space between the sealing member 30 and the base plate 50.

Note that in relation to the cross-sectional views of FIG. 3(*a*), FIG. 4(*a*) and so forth, it has been described above that the resin member 40 is s filled so as to completely adhere to the surface of the sealing member 30, the inner surface of the case 20, the resin bonding surface 52 of the base plate 50, and the leads 60 in the annular spaces 32. However, the present invention is not limited thereto. That is, the present invention does not exclude a resin member 40 that is slightly spaced apart from the above-described constituent parts, as long as the desired long-tom reliability of the electrolytic capacitor 1 is substantially ensured by providing at least one protrusion 70 on the resin bonding surface 52, thus lengthening an entry path of air or the like entering the case 20 from the outside and an evaporation-diffusion path of a liquid, such as the electrolytic solution in the case 20, being evaporated and diffused to the outside, and making these paths intricate, as described above.

(Modifications of Base Plate (Insulating Plate))

Figure 12C:
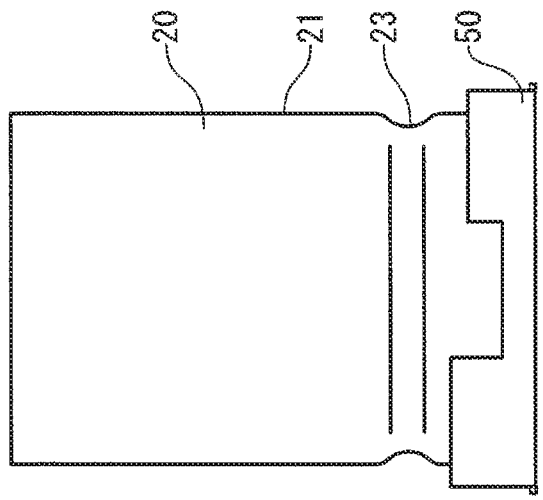
FIGS. 12(a) to 12(c) are a plan view, a bottom view, and a side view similar to FIGS. 2(a) to 2(c), showing an electrolytic capacitor according to a modification of the first embodiment.
Figure 12A:
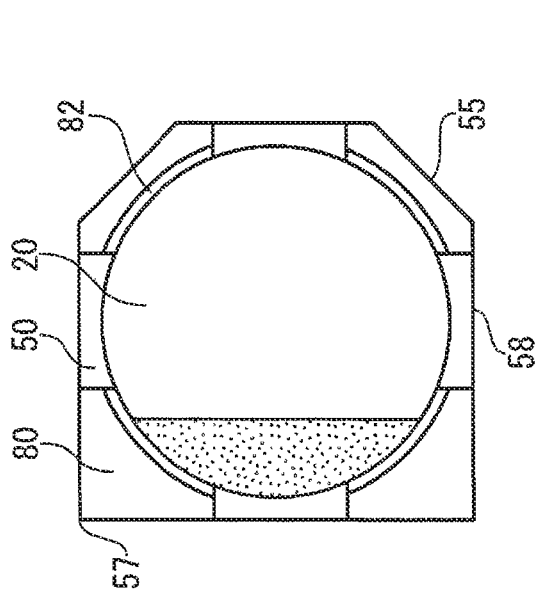
Figure 12B:
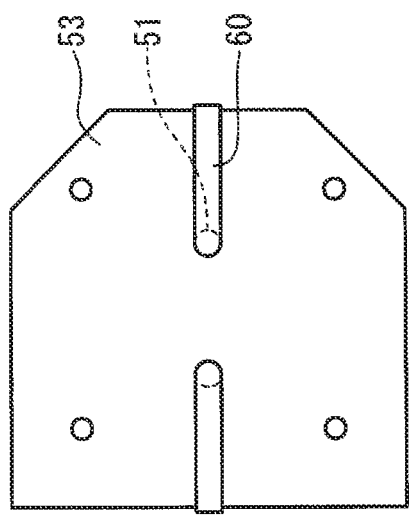

FIGS. 12(*a*) to 12(*c*) and FIGS. 13(*a*) to 13(*c*) are plan views, bottom views, and side views, respectively, similar to FIGS. 2(*a*) to 2(*c*), showing electrolytic capacitors 1 according to modifications of the first embodiment described above. Note that the electrolytic capacitors 1 according to the modifications have the same configuration as that of the above-described embodiment except that the base plate 50 includes wall portions 80 extending along the case 20. Therefore, descriptions of redundant configurations have been omitted.

While the base plate 50 of the electrolytic capacitor 1 according to the first embodiment described above is generally called a "flat base plate", the base plate 50 of the electrolytic capacitor 1 according to the modification shown in FIGS. 12(*a*) to 12(*c*) is also referred to as an "alignment flat base plate" because it includes wall portions 80 extending along the curled portion 25 of the case 20, and the wall portions 80 serve to align the case 20 with the base plate 50 in the horizontal direction. Additionally, the base plate 50 according to the modification shown in FIGS. 13(*a*) to 13(*c*) is also referred to as a "vibration-resistant base plate" because it includes vibration-resistant wall portions 80 extending along the side portion 21 and the drawn portion 23 of the case 20 over a longer length, and the vibration-resistant wall portions 80 serve to reliably fix the case 20 to the base plate 50 to enhance the vibration resistance. The "alignment flat base plate" and the "vibration-resistant base plate" both include wall portions 80 on the corner portions 57 of the base plate 50. Accordingly, in the present application, these base plates will be hereinafter collectively described and referred to as a "vibration-resistant base plate 50" for the sake of convenience.

Although the detailed description has been omitted, as described above in the embodiments according to the electrolytic capacitor 1 including the flat base plate, the recessed flow channels 56 (groove portions) of the base plate 50 and the slit 26 of the curled portion 25 that provide communication (connection) between the resin member 40 and the peripheral fixing portions 42 can be similarly applied to the electrolytic capacitor 1 including the vibration-resistant base plate.

Figure 14:
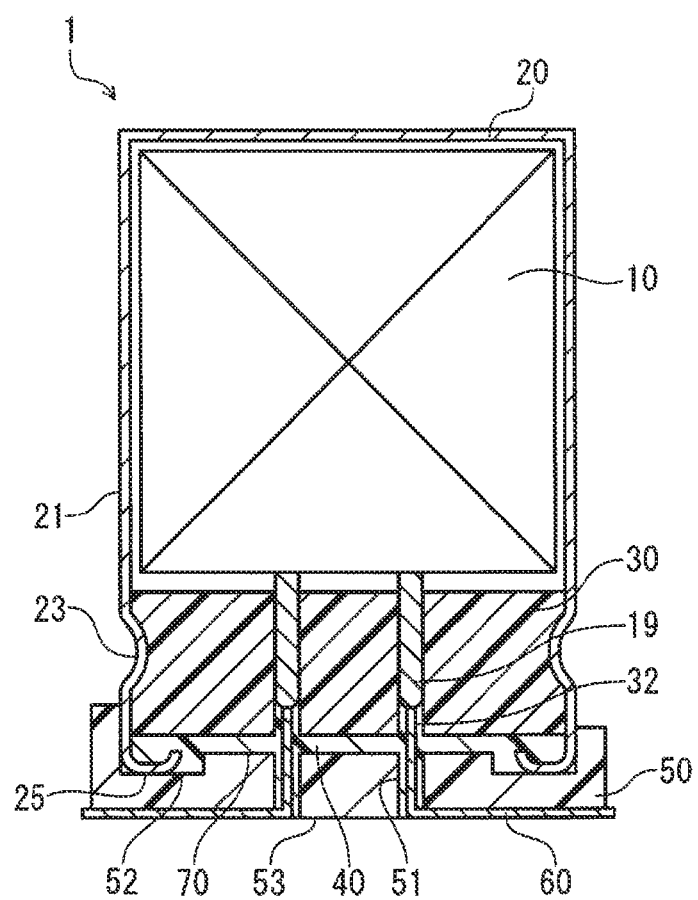
FIG. 14 is a cross-sectional view of the electrolytic capacitor, taken along the line XIV-XIV in FIG. 13(a).
Figure 15:
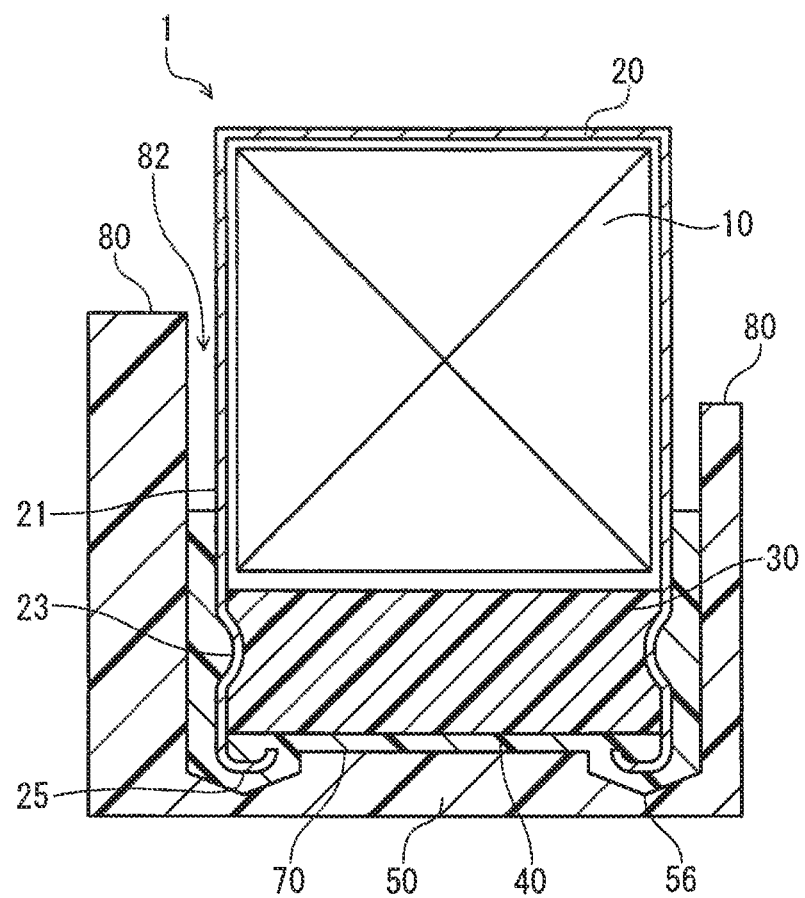
FIG. 15 is a cross-sectional view of the electrolytic capacitor, taken along the line XV-XV in FIG. 13(a).

FIG. 14 is a cross-sectional view taken along the line XIV-XIV in FIG. 13(*a*), and FIG. 15 is a cross-sectional view taken along the line XV-XV in FIG. 13(*a*). The vibration-resistant base plate 50 includes wall portions 80 at the corner portions 57, and is configured such that the resin member 40 is filled in a gap 82 formed between the side portion 21 (alternatively, the drawn portion 23 or the curled portion 25) of the case 20 and each of the wall portions 80, as shown in FIG. 15. The higher the wall portions 80 of the vibration-resistant base plate 50, the larger the amount of the fluid resin filled between the case 20 and the wall portions 80 of the vibration-resistant base plate 50 is, so that the adhesion strength between the resin member 40 and each of the base plate 50 and the case 20 can be further increased. Thus, the electrolytic capacitor 1 including the vibration-resistant base plate 50 blocks air or the like entering from the outside, and prevents evaporation and diffusion of an electrolytic solution or the like to the outside, thus making it possible to realize higher reliability of the electrolytic capacitor 1. As shown in FIG. 14, each of the wall portions 80 has a portion having a small distance from the side portion 21 of the case 20, thus allowing the alignment between the case 20 and the vibration-resistant base plate 50 to be performed more accurately.

Figure 16:
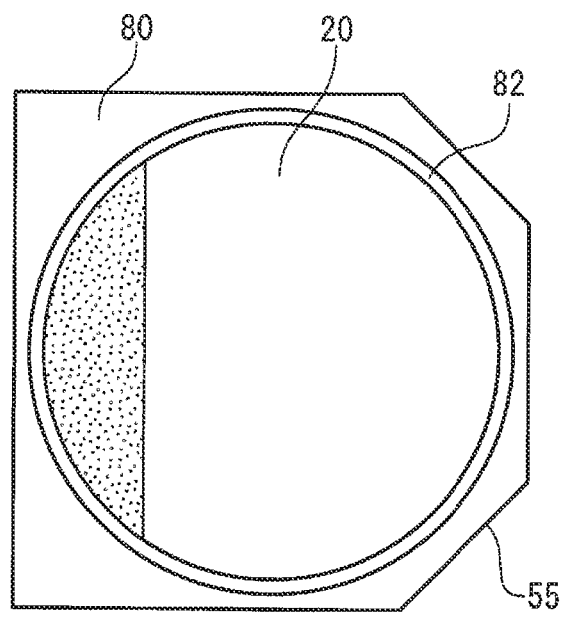
FIG. 16 is a plan view of an electrolytic capacitor according to yet another modification of the first embodiment.

As described above, in general, the planar dimensions of the base plate 50 are specified by the user specification or a standard specification. As shown in FIG. 16, the diameter of the case 20 may be reduced, or the planar dimensions of the base plate 50 may be increased. Then, the wall portion 80 may be formed not only on the corner portions 57 of the vibration-resistant base plate 50 but also so as to surround the case 20, thus allowing the fluid resin (the resin member 40) to be filled in the gap 82 provided around the entire circumference of the case 20. The fluid resin filled in the gap 82 provided around the entire circumference of the case 20 can further increase the adhesion strength between the resin member 40 and each of the base plate 50 and the case 20, as compared with the fluid resin only filled in the gap 82 between the corner portions 57 of the base plate 50 and the case 20. The electrolytic capacitor 1 including the vibration-resistant base plate 50 configured in this manner can more reliably achieve the blocking of air or the like entering from the outside and the prevention of evaporation and diffusion of an electrolytic solution or the like to the outside, thus realizing higher reliability of the electrolytic capacitor 1.

Second Embodiment

An electrolytic capacitor 1 according to a second embodiment of the present invention will be described with reference to FIGS. 17 to 27. The electrolytic capacitor 1 according to the second embodiment generally has the same configuration as that of the first embodiment, except that the base plate 50 includes at least one recess 75 on the resin bonding surface 52, in place of the protrusion 70, and therefore, descriptions of redundant details have been omitted.

Figure 17:
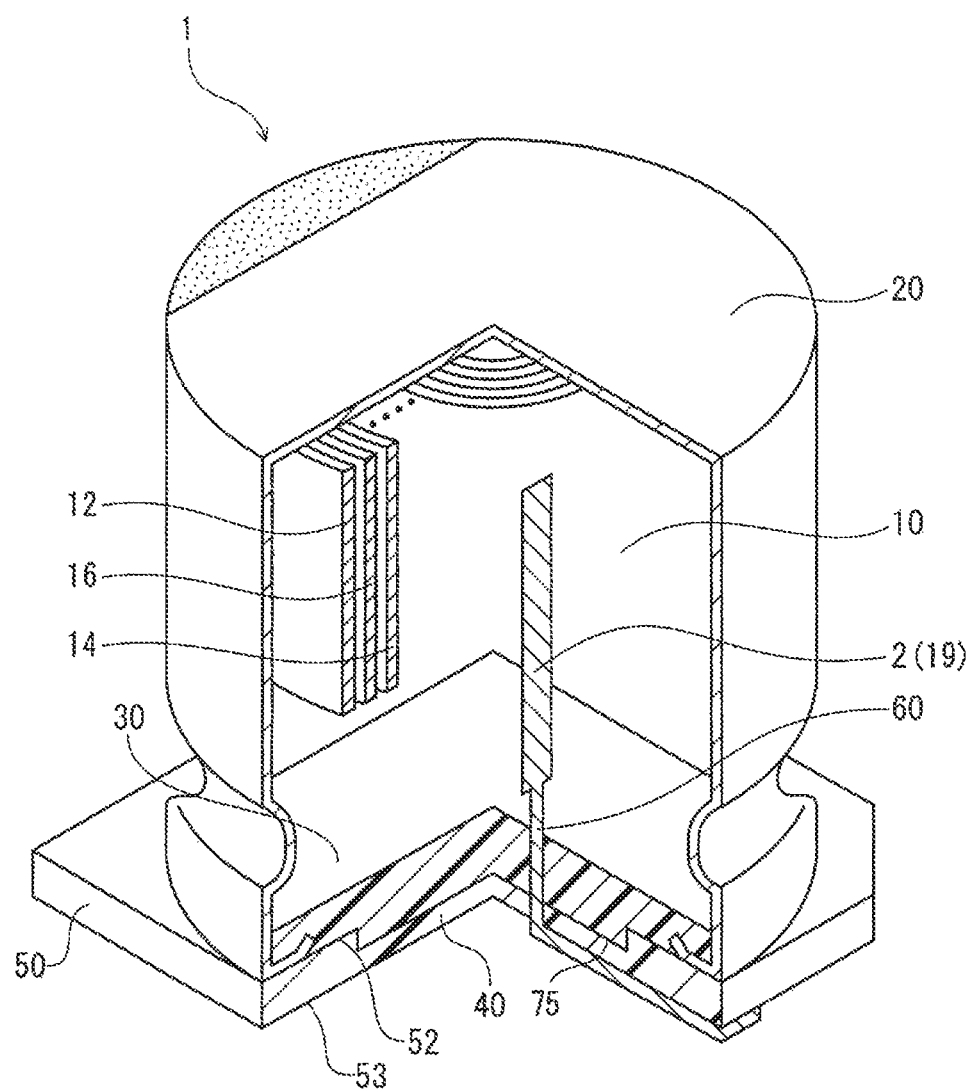
FIG. 17 is a partial broken-away perspective view partially showing the interior of an electrolytic capacitor according to a second embodiment of the present invention.

FIG. 17 is a partial broken-away perspective view partially showing the interior of the electrolytic capacitor 1 according to the second embodiment of the present invention. A plan view, a bottom view, and a side view showing the outer shape of the electrolytic capacitor 1 according to the second embodiment are the same as FIG. 2(*a*) to 2(*c*) according to the first embodiment.

A capacitor element 10, a case 20, a sealing member 30, a resin member 40, and leads 60 (electrodes 2) that are used for the electrolytic capacitor 1 according to the second embodiment have the same configurations as those of the first embodiment, and are formed in the same manner as in the first embodiment.

Figure 3A:
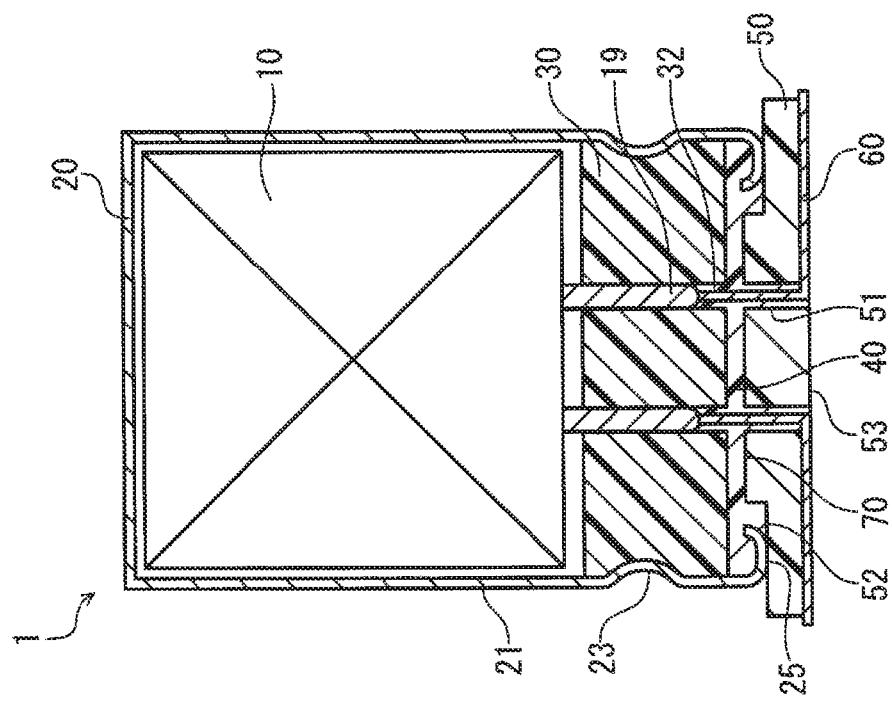
FIG. 3(a) is a cross-sectional view of the electrolytic capacitor, taken along the line III-III in FIG. 2(a)
Figure 18B:
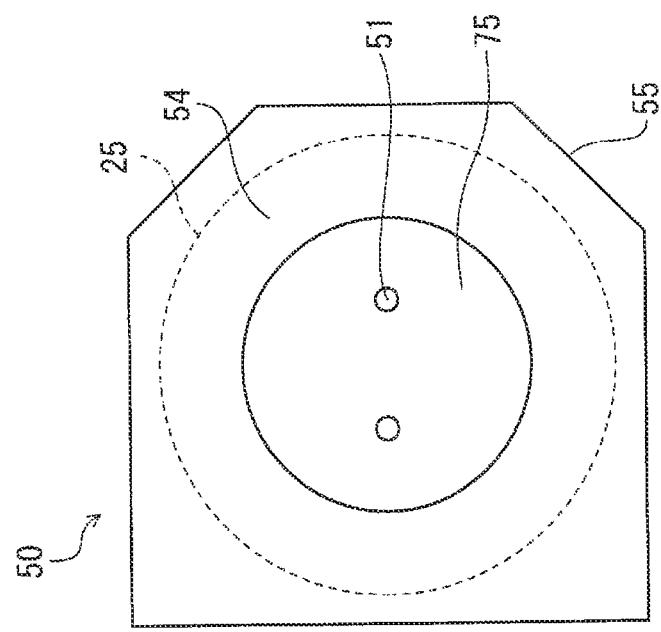
FIG. 18(b) is a plan view of the base plate shown in FIG. 18(a), as viewed from above.
Figure 18A:
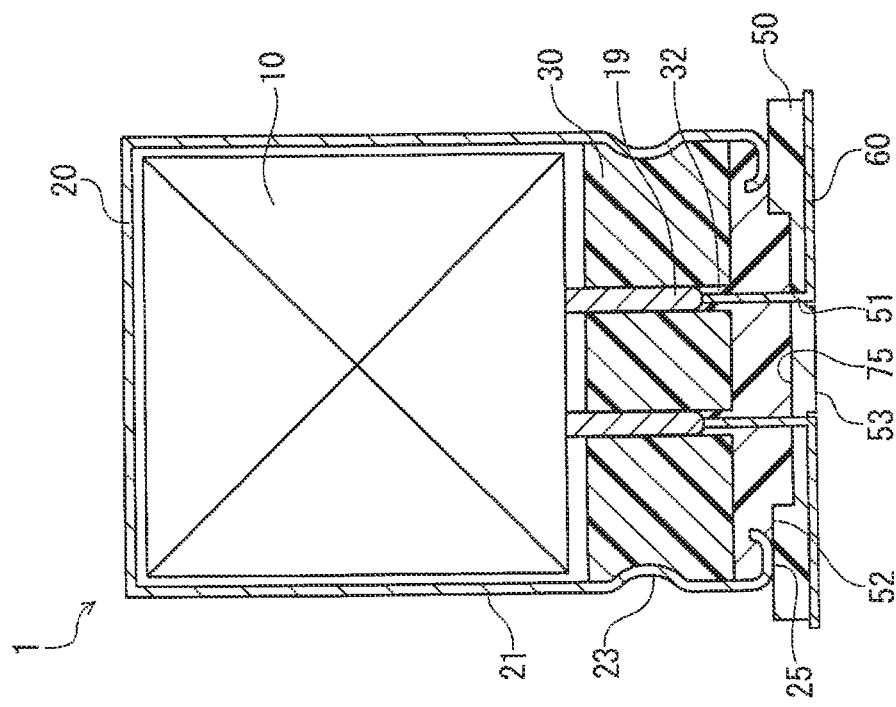
FIG. 18(a) is a cross-sectional view similar to FIG. 3(a), showing the electrolytic capacitor according to the second embodiment
Figure 19B:
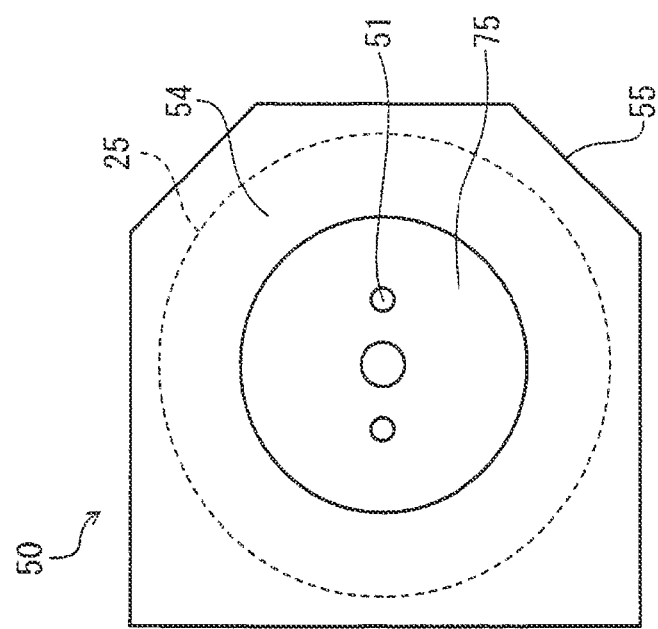
FIG. 19(b) is a plan view of the base plate shown in FIG. 19(a), as viewed from above.
Figure 19A:
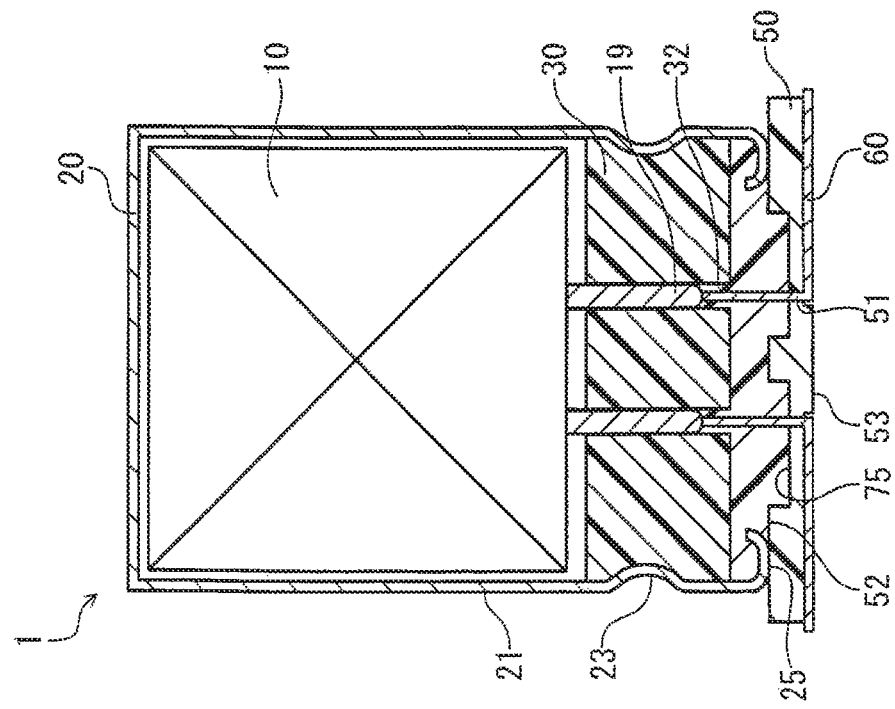
FIG. 19(a) is a cross-sectional view of another electrolytic capacitor according to the second embodiment.
Figure 20:
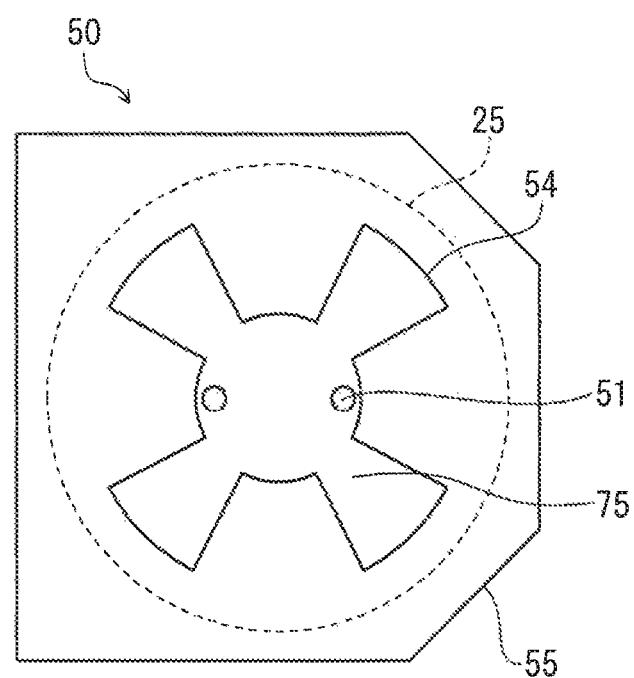
FIG. 20 is a plan view of a base plate of yet another electrolytic capacitor according to the second embodiment, as viewed from above.

FIG. 18(a) is a cross-sectional view of the electrolytic capacitor 1 according to the second embodiment, similar to FIG. 3(a), and FIG. 18(b) is a plan view of the base plate shown in FIG. 18(a), as viewed from above. FIG. 19(a) is a cross-sectional view of another electrolytic capacitor 1 according to the second embodiment, and FIG. 19(b) is a plan view of the base plate 50 shown in FIG. 19(a), as viewed from above. FIG. 20 is a plan view of a base plate 50 of yet another electrolytic capacitor 1 according to the second embodiment, as viewed from above. In the drawings, a set of points (i.e., a circle) at which the curled portion 25 of the case 20 abuts against the reference surface 54 of the base plate 50 is indicated by the dashed line.

As described above, in the electrolytic capacitors 1 according to the second embodiment, the base plate 50 includes at least one recess 75 on the resin bonding surface 52 (in particular, see FIGS. 17, 18(a) and 19(a)).

That is, according to the second embodiment of the present invention, as in the case of the first embodiment, the resin member 40 is fixed so as to adhere to the case 20 and the base plate 50 by providing the base plate 50 with the recess 75. Accordingly, even if a liquid such as an electrolytic solution is evaporated in the case 20, and infiltrates (permeates) into the sealing member 30 or reaches the resin member 40 via minutes voids, the resin member 40 can substantially suppress or prevent evaporation and diffusion of the electrolytic solution from the inside to the outside of the case 20. Thus, it is possible to maintain the desired reliability of the electrolytic capacitor 1.

The recess 75 according to the second embodiment of the present invention can enhance the adhesion (sealing performance) between the resin member 40 (adhesive material) and each of the case 20 and the sealing member 30 and can lengthen an entry path of air or the like entering the case 20 from the outside and an evaporation-diffusion path of a liquid, such as the electrolytic solution in the case 20, being evaporated and diffused to the outside, and make these paths intricate (circuitous). Thus, it is possible to realize the desired reliability of the electrolytic capacitor 1 over a longer period of time.

Furthermore, the resin member 40 according to the second embodiment is filled so as to seal the annular spaces 32 formed around the leads 60 in a liquid-tight manner. Accordingly, even if the electrolytic solution reaches the interface between the sealing member 30 and the resin member 40, or the annular space 32, it is possible to prevent corrosion of the leads 60 formed of a material containing a transition metal (see FIGS. 18(a) and 19(a)).

The production processes performed before and after filing the resin member 40, and the specific properties and the constituent materials of the fluid resin are the same as those of the first embodiment, and therefore, the detailed descriptions thereof have been omitted.

As shown in FIG. 18(b) and FIG. 19(b), the base plate 50 (insulating plate), in its simplest form, has a substantially square planar shape, and includes two cut-out portions 55 for indicating the polarities. In addition, the base plate 50 has a resin bonding surface 52 (upper surface) that abuts against the resin member 40, and a mounting surface 53 (lower surface) opposed to a mounting substrate (not shown), and includes at least one recess 75 on the resin bonding surface 52. The recess 75 may have a circular planar shape formed concentrically with the center of the case as shown in FIG. 18(b), or may have a toroidal planar shape as shown in FIG. 19(b). Alternatively, the recess 75 may be a combination of a recess 75 disposed near the center and recesses 75 extending radially (in the radial direction), as shown in FIG. 20. Further, a larger number of recesses 75 may be provided, or a grid-shaped or zigzag-shaped recess 75 (not shown) may be provided.

When the electrolytic capacitor 1 is subjected to a significant change in ambient temperature (thermal shock) during use, the sealing member 30 tends to significantly expand or contract relative to the resin member 40, due to the difference in coefficient of thermal expansion between the sealing member 30 and the resin member 40. However, according to the second embodiment of the present invention, by providing the resin bonding surface 52 with the recess 75, it is possible to substantially increase the adhesion strength between the sealing member 30 and the resin member 40 to reliably block air (oxygen) and/or water (water vapor) entering from the outside, and to substantially suppress or prevent evaporation and diffusion (reduction) of a liquid such as an electrolytic solution to the outside of the case 20, thus ensuring the desired long-term reliability of the electrolytic capacitor 1.

Figure 21:
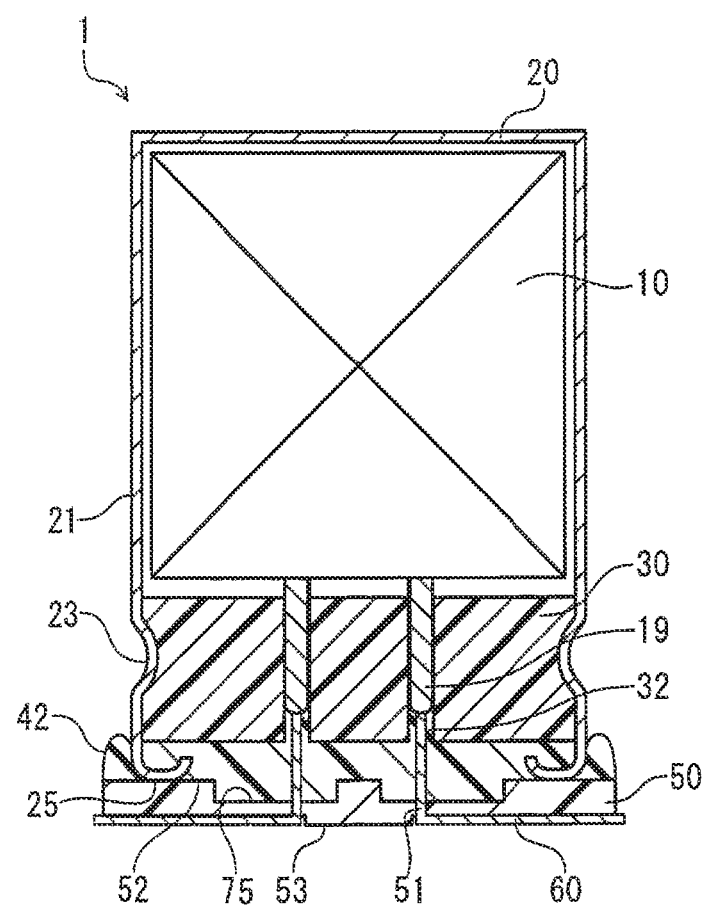
FIG. 21 is a cross-sectional view similar to FIG. 19(a), showing peripheral fixing portions that communicate with a resin member of the electrolytic capacitor.

Furthermore, the resin member 40 according to the second embodiment of the present invention preferably includes, as shown in FIG. 21, peripheral fixing portions 42 extending from the curled portion 25 toward the drawn portion 23, and configured to restrict or fix the case 20 from the outside by being bonded to at least a portion of the outer surface of the case 20. Accordingly, the adhesion strength between the resin member 40 and each of the base plate 50 and the case 20 is further improved, so that it is possible to more reliably achieve the blocking of air or the like entering from the outside, and the prevention of evaporation and diffusion of an electrolytic solution or the like to the outside, thus realizing higher reliability of the electrolytic capacitor 1.

FIG. 22(a) to 22(d) are plan views of a base plate 50 obtained by forming recessed flow channels 56 (groove portions) in the reference surface 54 of the resin bonding surface 52 of the base plate 50 shown in FIGS. 18(b) and 19(b). In the drawings, the recessed flow channels 56 are hatched, and a set of points (i.e., a dashed circle) at which the curled portion 25 of the case 20 abuts against the reference surface 54 of the base plate 50 is indicated by the dashed line, for the sake of convenience.

Figure 22A:
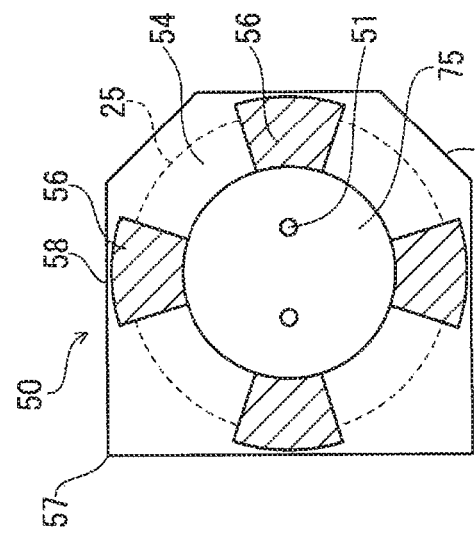
FIGS. 22(a) to 22(d) are plan views similar to FIG. 18(b) and FIG. 19(b), showing recessed flow channels (groove portions) formed in a resin bonding surface.
Figure 22B:
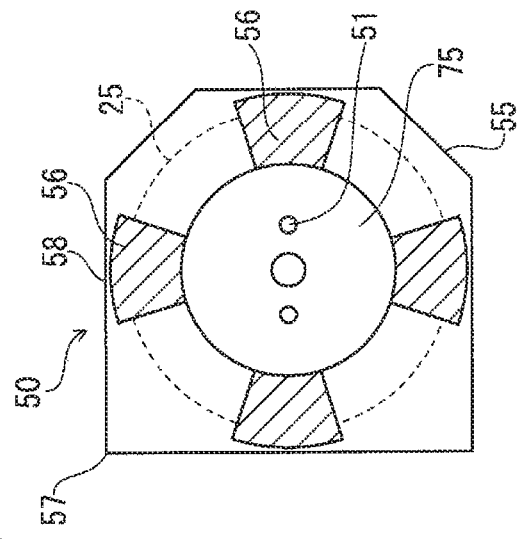
Figure 22C:
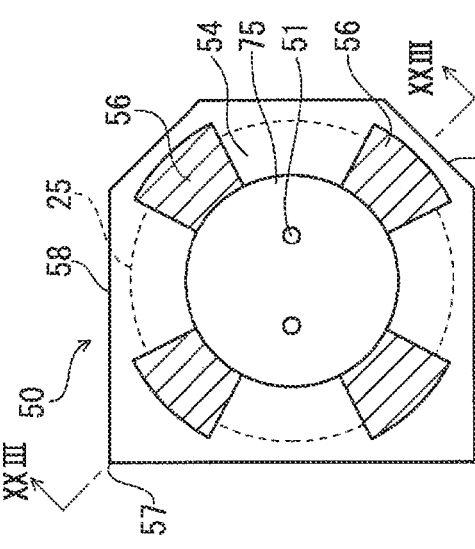
Figure 22D:
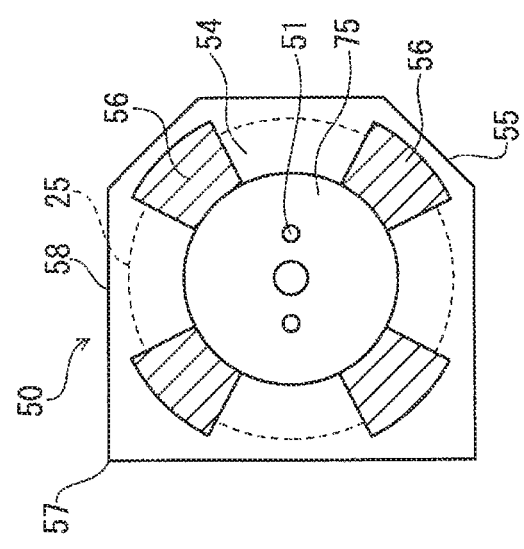

The recessed flow channels 56 shown in FIGS. 22(a) and 22(b) extend toward the corner portions 57 of the base plate 50, and the peripheral fixing portions 42 are formed near the corner portions 57 of the base plate 50. The recessed flow channels 56 shown in FIGS. 22(c) and 22(d) extend toward the end portions 58 of the base plate 50, and the peripheral fixing portions 42 are fat med near the end portions 58 of the base plate 50. Note that FIG. 23 is a cross-sectional view taken along the line XXIII-XXIII in FIG. 22(a), showing the recessed flow channels 56 extending toward the corner portions 57 of the base plate 50.

Figure 23:
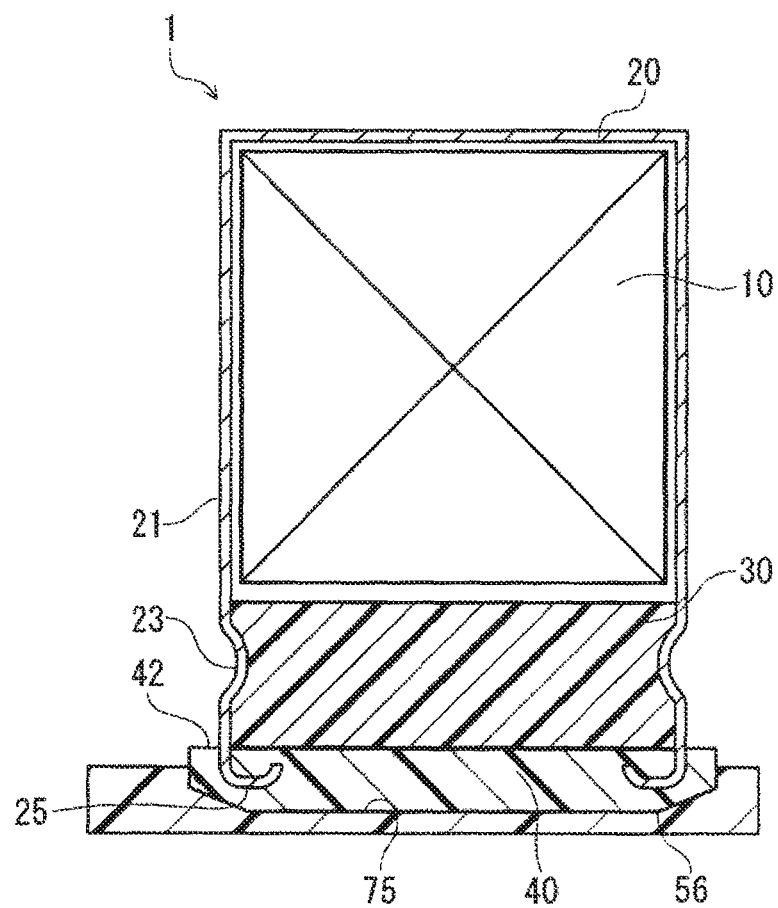
FIG. 23 is a cross-sectional view of the electrolytic capacitor, taken along the line XXIII-XXIII in FIG. 22(a).

Although the recessed flow channels 56 shown in FIG. 23 are illustrated as having the same depth as the recess 75 formed in the base plate 50 on the inner side of the curled portion 25, the recessed flow channels 56 are not limited thereto, and may be formed so as to be deeper or shallower than the recess 75.

The configurations of the peripheral fixing portions 42, the recessed flow channels 56, and the slit 26, and the method for forming the peripheral fixing portions 42 are similar to those described in the first embodiment, and therefore, further descriptions of redundant details have been omitted.

Figure 24:
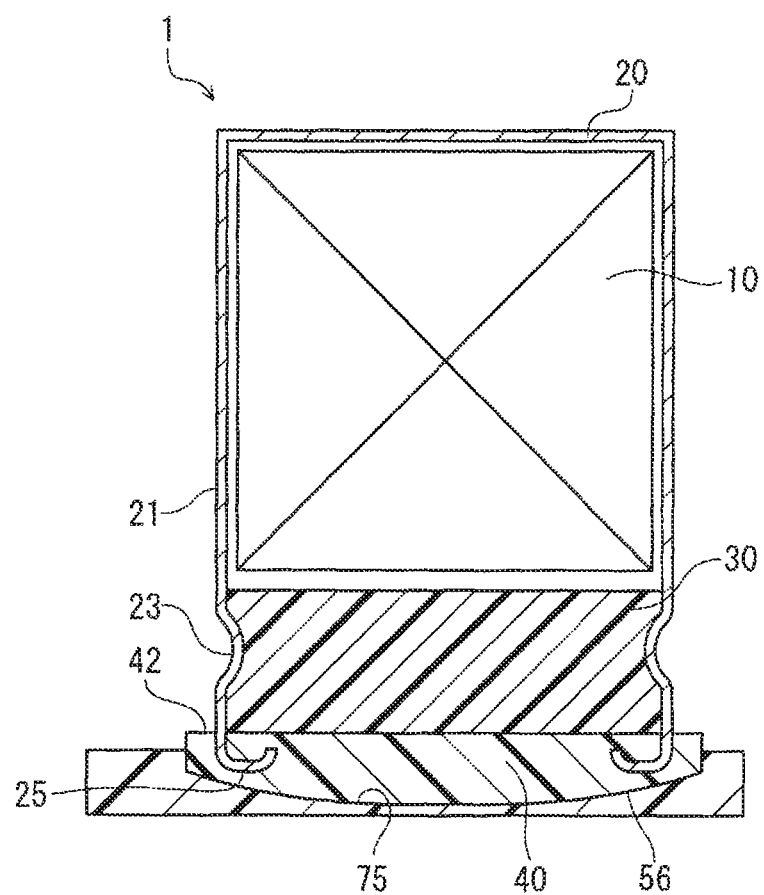
FIG. 24 is a cross-sectional view similar to FIG. 23, showing a base plate including a curved surface protruding downward from the center thereof toward the periphery thereof.

Note that it is preferable to prevent entry of air bubbles into the space between the sealing member 30 and the base plate 50 when the base plate 50 is pressed downward with a predetermined pressure after the fluid resin has been potted or injected onto the sealing member 30. Since the base plate 50 shown in FIG. 24 is configured to include a curved surface protruding downward from the center thereof to the periphery thereof, air bubbles, which may be contained in the fluid resin, are discharged from the center to the periphery, and further to the outside of the case 20 from the recessed flow channels 56.

Figure 25:
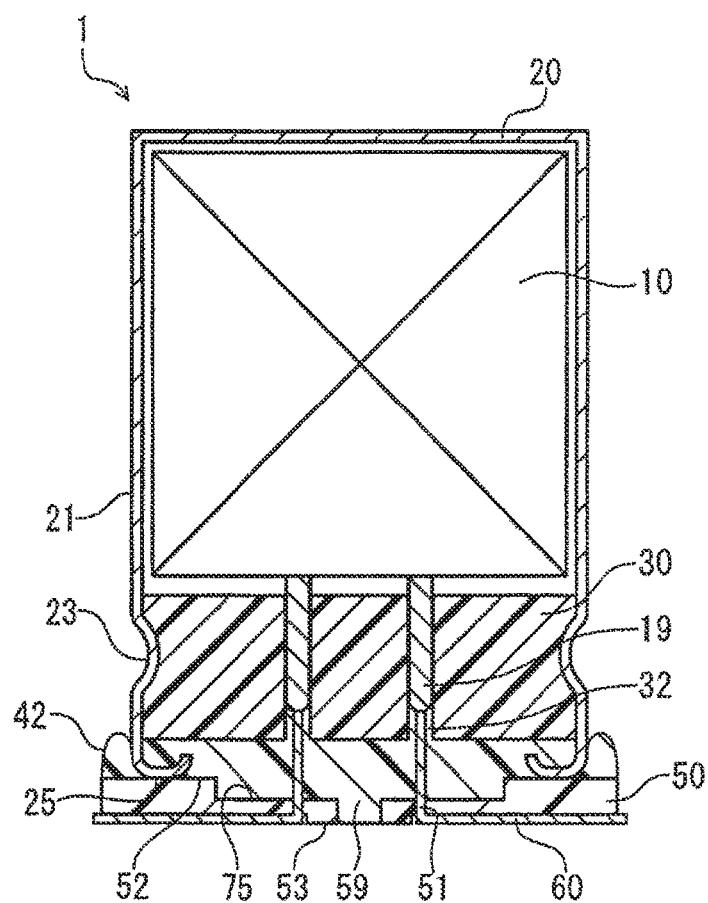
FIG. 25 is a cross-sectional view similar to FIG. 21, showing a resin injection hole extending through from a resin bonding surface through a mounting surface.

As shown in FIG. 25, the base plate 50 may have a resin injection hole 59 extending therethrough from the resin bonding surface 52 to the mounting surface 53 for injecting uncured fluid resin into the space between the sealing member 30 and the base plate 50. One or more resin injection holes 59 may be provided. It is preferable that, separately from the resin injection hole 59, the base plate 50 has an exhaust hole (not shown) for discharging air when injecting the fluid resin, and prevents entry of air bubbles into the space between the sealing member 30 and the base plate 50. Upon completion of filling of the fluid resin, the resin injection hole 59 and the exhaust hole are filled with the fluid resin, as in the case of the space between the sealing member 30 and the base plate 50.

Although not illustrated in detail here, the modifications described with reference to the FIGS. 12(a) to 12(c), FIGS. 13(a) to 13(c) and FIGS. 14 to 16 for the vibration-resistant base plate 50 (insulating plate) according to the first embodiment can be similarly applied to the second embodiment (the vibration-resistant base plate 50 including the recess 75).

Figure 26:
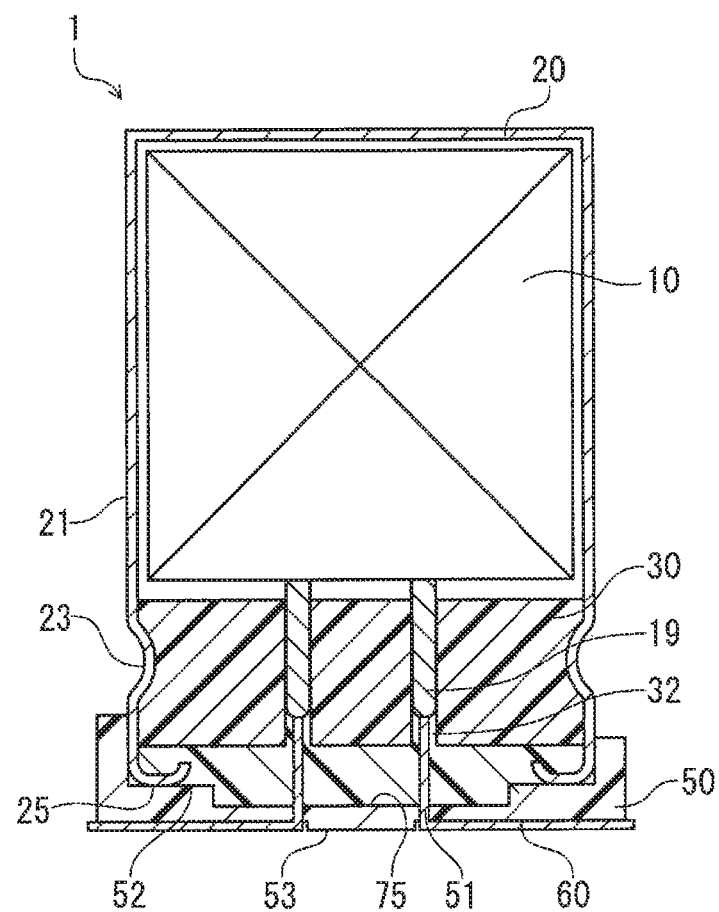
FIG. 26 is a cross-sectional view of the electrolytic capacitor according to the second embodiment, taken along the line XIV-XIV in FIG. 13(a).
Figure 27:
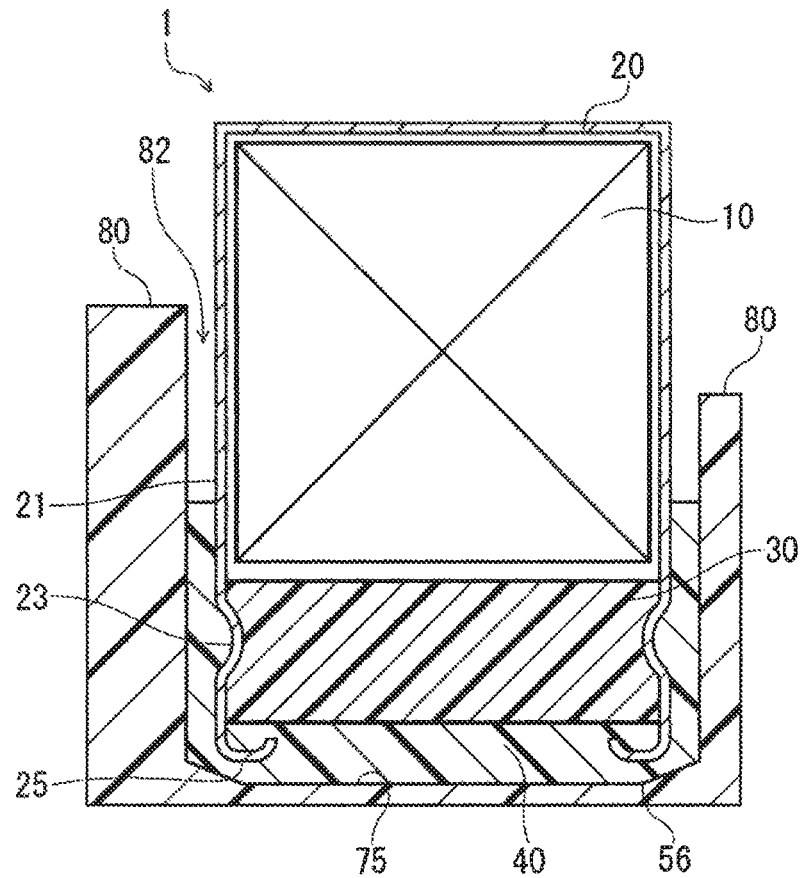
FIG. 27 is a cross-sectional view of the electrolytic capacitor according to the second embodiment, taken along the line XV-XV in FIG. 13(a).

FIGS. 26 and 27 are cross-sectional views of an electrolytic capacitor according to the second embodiment, taken along the line XIV-XIV and the line XV-XV, respectively, in FIG. 13(a). The vibration-resistant base plate 50 includes wall portions 80 at the corner portions 57, and is configured such that the resin member 40 is filled in a gap 82 formed between the side portion 21 (alternatively, the drawn portion 23 or the curled portion 25) of the case 20 and each of the wall portions 80, as shown in FIG. 27. The higher the wall portions 80 of the vibration-resistant base plate 50, the larger the amount of the fluid resin filled between the case 20 and the wall portions 80 of the vibration-resistant base plate 50 is, so that the adhesion strength between the resin member 40 and each of the base plate 50 and the case 20 can be further increased. Thus, the electrolytic capacitor 1 including the vibration-resistant base plate 50 blocks air or the like entering from the outside, and prevents evaporation and diffusion of an electrolytic solution or the like to the outside, thus making it possible to realize higher reliability of the electrolytic capacitor 1. As shown in FIG. 26, each of the wall portions 80 has a portion having a small distance from the side portion 21 of the case 20, thus allowing the alignment between the case 20 and the vibration-resistant base plate 50 to be performed more accurately.

INDUSTRIAL APPLICABILITY

The present invention is applicable to an electrolytic capacitor including a resin member filled between a sealing member and a base plate.

REFERENCE SIGNS LIST

1 . . . Electrolytic capacitor
2 . . . Electrode
10 . . . Capacitor element
12 . . . Anode foil
14 . . . Cathode foil
16 . . . Separator
19 . . . Tab portion
20 . . . Case
21 . . . Side portion
23 . . . drawn portion
25 . . . Curled portion
26 . . . Slit
30 . . . Sealing member
32 . . . Annular space
40 . . . Resin member (adhesive material)
42 . . . Peripheral fixing portion
50 . . . Base plate (insulating plate)
51 . . . Through hole
52 . . . Resin bonding surface
53 . . . Mounting surface
54 . . . Reference surface
55 . . . Cut-out portion
56 . . . Recessed flow channel (groove portion)
57 . . . Corner portion
58 . . . End portion
59 . . . Resin injection hole
60 . . . Lead
70 . . . Protrusion
75 . . . Recess
80 . . . Wall portion
82 . . . Gap

The invention claimed is:

1. An electrolytic capacitor comprising:
a capacitor element including a pair of electrodes;
an electrolyte interposed between the pair of electrodes;
a pair of leads electrically connected to the pair of electrodes, respectively;
a case in which the capacitor element and the electrolyte are accommodated, and that has an opening;
a sealing member that seals the opening, and has a pair of insertion holes for leading out the leads;
an insulating plate having a pair of through holes for leading out the leads; and
a resin member filled between the sealing member and the insulating plate, wherein:
the insulating plate has a resin bonding surface that abuts against the resin member, and a mounting surface opposed to the resin bonding surface, and includes at least one protrusion or recess on the resin bonding surface,
the case includes a curled portion defining the opening,
the resin member includes a peripheral fixing portion extending along the curled portion and being bonded to at least a portion of an outer surface of the case,
the curled portion has at least one slit, and
the slit forms a flow channel that provides communication between the resin member filled between the sealing member and the insulating plate, and the peripheral fixing portion.

2. The electrolytic capacitor according to claim 1, wherein:
the insulating plate has at least one groove portion disposed below at least a portion of the curled portion on the resin bonding surface, and
the groove portion forms the flow channel.

3. The electrolytic capacitor according to claim 2, wherein the case includes a drawn portion extending continuously with the curled portion on the outer surface of the case, and a side portion extending continuously with the drawn portion, the insulating plate includes a wall portion extending from the resin bonding surface to the side portion along the outer surface of the case, and the resin member is configured to cover a portion of the outer surface in a gap formed between the outer surface and the wall portion.

4. The electrolytic capacitor according to claim 1, wherein the case includes a drawn portion extending continuously with the curled portion on the outer surface of the case, and a side portion extending continuously with the drawn portion, the insulating plate includes a wall portion extending from the resin bonding surface to the side portion along the outer surface of the case, and the resin member is configured to cover a portion of the outer surface in a gap formed between the outer surface and the wall portion.

5. The electrolytic capacitor according to claim 3, wherein a principal surface of the insulating plate has a substantially rectangular shape, and the wall portion is disposed at a corner portion of the insulating plate.

6. The electrolytic capacitor according to claim 4, wherein a principal surface of the insulating plate has a substantially rectangular shape, and the wall portion is disposed at a corner portion of the insulating plate.

7. The electrolytic capacitor according to claim 1, wherein an end portion of the curled portion is spaced apart from the sealing member, and the resin member is filled between the curled portion and the sealing member.

8. The electrolytic capacitor according to claim 1, wherein the protrusion or the recess of the insulating plate is disposed inward of the curled portion.

9. The electrolytic capacitor according to claim 1, wherein at least a portion of the curled portion abuts against the resin bonding surface of the insulating plate.

10. The electrolytic capacitor according to claim 1, wherein each of the electrodes includes a tab portion that is electrically connected to the corresponding lead inside the sealing member, the sealing member has a pair of annular spaces respectively formed around the leads having a diameter smaller than that of the tab portions, and the resin member is filled in the annular spaces.

11. The electrolytic capacitor according to claim 1, wherein the insulating plate has a resin injection hole extending therethrough from the resin bonding surface to the mounting surface between the pair of through holes.

12. The electrolytic capacitor according to claim 1, wherein the case has a substantially circular planar shape, the insulating plate includes at least one protrusion on the resin bonding surface, and the resin bonding surface of the insulating plate includes a curved surface protruding upward from a center thereof toward a periphery thereof.

13. The electrolytic capacitor according to claim 1, wherein the case has a substantially circular planar shape, the insulating plate includes at least one recess on the resin bonding surface, and the resin bonding surface of the insulating plate includes a curved surface protruding downward from a center thereof toward a periphery thereof.

14. An electrolytic capacitor comprising:

a case in which a capacitor element, an electrolyte, and a sealing member are accommodated, wherein:

the electrolytic capacitor comprises a resin member filled between the sealing member and an insulating plate, and the insulating plate has a resin bonding surface that abuts against the resin member, and a mounting surface opposed to the resin bonding surface, and includes at least one protrusion or recess on the resin bonding surface, the case includes a curled portion defining the opening, the resin member includes a peripheral fixing portion extending along the curled portion and being bonded to at least a portion of an outer surface of the case, the curled portion has at least one slit, and the slit forms a flow channel that provides communication between the resin member filled between the sealing member and the insulating plate, and the peripheral fixing portion.

15. The electrolytic capacitor according to claim 2, wherein the at least one groove portion extends radially toward the curled portion, and the resin member is disposed to fill the groove portion, so as to communicate with the peripheral fixing portion.

16. An electrolytic capacitor comprising:

a capacitor element including a pair of electrodes;

an electrolyte interposed between the pair of electrodes;

a pair of leads electrically connected to the pair of electrodes, respectively;

a case in which the capacitor element and the electrolyte are accommodated, and that has an opening;

a sealing member that seals the opening, and has a pair of insertion holes for leading out the leads;

an insulating plate having a pair of through holes for leading out the leads; and a resin member filled between the sealing member and the insulating plate, wherein:

the insulating plate has a resin bonding surface that abuts against the resin member, and a mounting surface opposed to the resin bonding surface, and includes at least one protrusion or recess on the resin bonding surface, the case includes a curled portion defining the opening, the resin member includes a peripheral fixing portion extending along the curled portion and being bonded to at least a portion of an outer surface of the case, the at least one protrusion or recess forms at least one groove portion extending radially, and the resin member is disposed to fill the groove portion, so as to communicate with the peripheral fixing portion.

* * * * *